United States Patent
Smith

(10) Patent No.: US 10,755,286 B2
(45) Date of Patent: Aug. 25, 2020

(54) TARGETED MARKETING SYSTEM AND METHOD

(75) Inventor: Linda M. Smith, Woodland Hills, CA (US)

(73) Assignee: FACECAKE MARKETING TECHNOLOGIES, INC., Calabasas, CA (US)

(*) Notice: Subject to any disclaimer, the term of this patent is extended or adjusted under 35 U.S.C. 154(b) by 1405 days.

(21) Appl. No.: 12/033,885

(22) Filed: Feb. 19, 2008

(65) Prior Publication Data

US 2008/0199042 A1    Aug. 21, 2008

Related U.S. Application Data

(63) Continuation-in-part of application No. 09/645,292, filed on Aug. 24, 2000, now Pat. No. 7,337,127.

(51) Int. Cl.
  *G06Q 30/00*    (2012.01)
  *G06Q 30/02*    (2012.01)

(52) U.S. Cl.
  CPC ......... *G06Q 30/02* (2013.01); *G06Q 30/0204* (2013.01); *G06Q 30/0239* (2013.01)

(58) Field of Classification Search
  USPC .......................................................... 705/14
  See application file for complete search history.

(56) References Cited

U.S. PATENT DOCUMENTS 4,539,585 A * 9/1985 Spackova et al. ............ 382/100
5,991,057 A * 11/1999 Goldstein ...................... 359/32

(Continued)

FOREIGN PATENT DOCUMENTS

JP    H2-168356    6/1990
JP    H9-288699    11/1997

(Continued)

OTHER PUBLICATIONS

Olsen, Stefanie, "Virtual Makeovers: Here's clicking at you kid", Jun. 28, 2000, CNET News, p. 1-5.*

(Continued)

*Primary Examiner* — Alvin L Brown

(57) ABSTRACT

A computer-implemented method for targeting marketing content to an online user, includes the steps of collecting data describing the user or the user's ownership item in a user profile, comparing the user profile with a target profile and presenting the user with content based on the comparison. The user profile includes a photographic likeness of the user or the user's ownership item, as well as information derived from the photographic likeness. Certain content may be dynamically created for the user based on the user profile and that content may include the photographic likeness, which may be altered to incorporate a portion of the content into the photographic likeness. In this manner, personalized advertisements for cosmetics, jewelry, clothing, cosmetic procedures, home improvement products, and other products or services may be created. The user profile also includes data describing the user's browsing habits and responses to context-specific survey questions. In one embodiment, metrics are assigned to the user profile data, and a data index identifying the user's preferences and purchasing habits is calculated for the user based on the assigned metrics. Each metric may also have an associated confidence factor, which causes the metric value to decay over time.

45 Claims, 26 Drawing Sheets

(56) References Cited

U.S. PATENT DOCUMENTS

| | | | |
|---|---|---|---|
| 6,142,628 A | 11/2000 | Saigo | |
| 6,166,744 A | 12/2000 | Jaszlics | |
| 6,293,284 B1* | 9/2001 | Rigg | A45D 44/005 132/200 |
| 6,307,568 B1 | 10/2001 | Rom | |
| 6,330,022 B1* | 12/2001 | Seligmann | 348/14.08 |
| 6,624,843 B2 | 9/2003 | Lennon | |
| 6,643,385 B1 | 11/2003 | Bravomalo | |
| 6,813,608 B1* | 11/2004 | Baranowski | 705/6 |
| 7,401,122 B2* | 7/2008 | Chen | 709/206 |
| 7,809,153 B2* | 10/2010 | Bravomalo et al. | 382/100 |
| 7,941,092 B2* | 5/2011 | Rao | 455/3.04 |
| 2001/0014868 A1* | 8/2001 | Herz et al. | 705/14 |
| 2002/0024528 A1 | 2/2002 | Lambertsen | |
| 2002/0071604 A1* | 6/2002 | Orpaz et al. | 382/162 |
| 2003/0110099 A1 | 6/2003 | Trajkovic | |
| 2005/0135675 A1 | 6/2005 | Chen et al. | |
| 2006/0181607 A1 | 8/2006 | McNelley | |
| 2007/0258656 A1 | 11/2007 | Aarabi | |
| 2008/0015878 A1 | 1/2008 | Feng et al. | |
| 2008/0133649 A1* | 6/2008 | Pennington et al. | 709/203 |
| 2008/0267443 A1* | 10/2008 | Aarabi | 382/100 |
| 2009/0265245 A1* | 10/2009 | Wright | 705/14.66 |

FOREIGN PATENT DOCUMENTS

| | | |
|---|---|---|
| JP | 2002-203238 | 7/2002 |
| JP | 2003-006623 | 1/2003 |
| JP | 2004-326488 | 11/2004 |
| JP | 2008-003724 | 1/2008 |

OTHER PUBLICATIONS

Business Wire, SegaSoft's Cosmopolitan Virtual Makeover Collection Debuts on Macintosh, Jul. 8, 1998, pp. 1-4.*

IT Review Staff, SegaSoft—Cosmopolitan Virtual Makeover review, Aug. 15, 1998, pp. 1-2.*

Mary Kay Virtual Makeover, www.marykay.com, Oct. 4, 1998.*

Zhang, An Intelligent Fitting Room Using Multi-Camera Perception, Proceedings of the 2008 International Conference on Intelligent User Interfaces, Jan. 13-16, 2008, 60-69, Gran Canaria, Canary Islands, Spain.

Kjaerside, ARDressCode: Augmented Dressing Room with Tag-based Motion Tracking and Real-Time Clothes Simulation, Central European Multimedia and Virtual Reality Conference (2005).

* cited by examiner

| Event | Date | Time |
|---|---|---|
| Go to Web Page A | August 22, 2000 | 12:01 p.m. |
| Click Link to Web Page B | August 22, 2000 | 12:05 p.m. |
| Click Link to Web Page C | August 22, 2000 | 12:05 p.m. |
| Click through Ad D | August 22, 2000 | 12:16 p.m. |
| Click Link to Web Page E | August 22, 2000 | 12:17 p.m. |
| Click Link to try product F | August 22, 2000 | 12:18 p.m. |
| Click Link to Web Page F | August 22, 2000 | 12:19 p.m. |

FIG. 5

FaceCake

Uploaded Image #3 | Saved Image #6

FaceBank™ User Profile

Name: Kacy Jones | Hair: Blonde
Gender: Female | Eyes: Blue
Age: 21 | Face Shape: Oval
Email: kj@yahoo.com | Body Type: Thin
Addr: 6923 Royer Ave | Skin Tone: Light
City: West Hills | Skin Type: Oily
State: CA | Hair Length: Long
Zip: 91307 | Hair Type: Fine
Country: USA | Hair Style: Straight
Cell: 213-422-6798 | Color: Yes
Carrier: AT&T

Statistic Categories

- Cosmetics
  - Lipstick
  - Lipliner
  - Eyeshadow
  - Eyeliner
  - Blush
  - Foundation
  - eyebrows
  - MORE
- Hair
- Jewelry
- Accessories
- Clothing
- Fragrance
- Skin Care
- Home Decor

Lipstick Detail

Color Preference: Mauve
Vendor Preference: Sephora
Purchase Frequency: 2 per month
Avg Monthly Spend: $35.00
Online Purchase: yes
Preferred Type: matte, long lasting
# of color trials last ( 30 )( 60 )( 90 ) days
91 Mauve    62 Brown    44 Red
36 Pink      32 Peach    12 Maroon
Upsell Recomendation: Jewelry
Favorite Jewelry Type: Necklace
Favorite Stone: Garnet

TARGETED MARKETING SYSTEM AND METHOD

CROSS-REFERENCE TO RELATED APPLICATIONS

This application is a continuation-in-part pursuant to 37 C.F.R. § 1.53(b) of U.S. patent application Ser. No. 09/645,292 filed Aug. 24, 2000 and entitled "Targeted Marketing System and Method". That parent application is incorporated by reference herein in its entirety.

BACKGROUND OF THE INVENTION

1. Field of the Invention

The present invention relates to targeted marketing, and in particular to systems and methods for personalizing marketing materials, advertisements, entertainment, educational materials, and other content to the individual preferences of Internet users.

2. Description of Related Art

Targeted marketing through the Internet is well known in the art. Individuals who navigate the World Wide Web ("Web") portion of the Internet are frequently presented with advertisements, promotions, and other content (collectively "content") targeted to their demographic and psychographic attributes, and other individual preferences and characteristics. In a typical scenario, an advertiser, promoter or other entity (collectively "content provider") selects a set of target demographics and/or psychographics ("target profile") for its content and makes the content accessible to Internet users through a Web site. The Web site operator, or another affiliated entity, maintains a user profile for each of its registered (or otherwise identifiable) users. Each user profile includes data fields for storing known attributes of its associated user, which may include name, address, telephone number, e-mail address, gender, age, race, and other personal information. When an individual accesses a Web site that includes a plurality of targeted content, the individual's user profile is compared against the target profile for the available targeted content, and the targeted content having a target profile that best fits the individual is displayed to the individual on the Web page.

The effectiveness of targeted marketing often depends on the quantity and quality of data collected for each user. For example, a primary source of user data is an online survey or questionnaire. Many Web sites require new users to establish an online profile before permitting access to certain Web pages or services. Each new user is prompted to provide the user's name, address, telephone number, gender, age, e-mail address and other demographic information. However, many users are reluctant to provide such private information over the Internet and set up "dummy" profiles with false data. Further, users are often reluctant to fill out a lengthy questionnaire that requires detailed answers, thus limiting the amount and type of information collected through this approach.

Additional user information is often collected by tracking the occurrence of certain user initiated events. For example, one common approach creates a log entry each time a user clicks through a displayed advertisement. Each user's online purchases made through the Web site may also be logged in the user profile. These events may be tracked through server-based programs and/or software executing on the user's computer. The data collected through these approaches is typically limited to a small subset of the user's actual online behavior, and attempts to correlate this behavioral data with user psychographics have proven to be inadequate.

In view of these and other limitations in the prior art, there is a need for a targeted marketing system and method that collects detailed and accurate user profile data and matches user profile data to target demographic and psychographic attributes in a meaningful manner. Further, there is a need for a way to use such collected data to create and provide advertisements, promotions or other content that will attract the user's attention.

SUMMARY OF THE INVENTION

The present invention provides a system and method for delivering targeted marketing to online Internet users, including users of mobile phone technologies, personal digital assistants ("PDA"), iTV applications, instant messaging applications, multimedia messaging applications, short messaging applications (such as text messaging applications) or any similar technology where data is downloaded from interconnected servers. In a preferred embodiment, psychometric information and a photographic likeness of a user are collected for use in personalizing marketing, advertising, entertainment, educational materials and other content.

In a preferred embodiment, at least one Web server and at least one network device are connected through a network, such as the Internet. The Web server may be any computing device that provides World Wide Web services on the Internet, and the network device may be any device that is adapted to access and navigate Web pages from the Web server through the Internet. Each user of the Web server registers through a registration Web page, which queries the user for basic demographic information such as name, address, telephone number, age, gender and income. The user registration includes the creation of a user profile, which is used by the Web server to store data associated with the registered user.

A preferred user profile includes initial survey responses provided by the user during registration, data describing the user's Web browsing habits and Web purchasing patterns, a photographic likeness of the user, context-specific survey responses and random survey responses. The user profile is analyzed to prepare a summary of the user's personality, buying motives, interests, activities, opinions and other characteristics.

The user's actions on each Web page provide insights into the user's preferences for the content available on the Web page. Each Web page includes one or more pieces of content, which may include text articles, banner ads, pictures, videos, audio files, etc. The Web site operator, advertiser, or other entity may select zero or more market segmentation variables to be associated with each piece of content, and assign metrics to be given upon the occurrence of each action. The assigned metric value depends on various factors such as the user action and the number of times this user action has been recorded for the particular content. The data stored in the user profile, such as the user's demographic and psychographic data, may also include an associated confidence factor that reduces the value of a metric, or the weight given to a data element, over time.

In a preferred embodiment, the user is encouraged to transmit the user's photographic likeness to the Web server for storage in the user's profile. Each image preferably includes a picture of the user's head and shoulders, full body or ownership item against a solid background. The photographic likeness is processed by converting the image to a standard image format, and then identifying facial features and outline, body features and outline or features and outlines of their ownership items from the image. Additional data is also collected from the picture for storage in the user profile such as the user's hair color, eye color, skin tone, face shape, body type and other information that may be derived from the photographic image.

Context-specific survey questions and random survey questions are asked periodically to verify weak data elements or supply missing data elements. These survey questions are less intrusive than a lengthy questionnaire and can be used throughout the Web site to gather information. In a preferred embodiment, the user profiles are analyzed in view of the target demographics and psychographics of the available content to identify data elements that have generally weak confidence factors or are otherwise deficient for use in accurately targeting the available content. The market researcher is then notified of the deficiencies in the data and a search is conducted to locate content having an associated market segmentation variable that relates to the deficient data element. Next, the market researcher is prompted to develop a context-specific survey question that relates to the content, the answer to which supplies the deficient data element. The market researcher is also prompted to develop a random survey question, the answer to which supplies to the deficient data element. Random questions may be presented to the user periodically, even while the user is viewing unrelated content.

The collected data in the user profile is also used to target specific content to the user. When selecting content to display to the user, the Web server automatically selects the content with target demographics and psychographics that best matches the user's data index calculated from the user profile. In addition, on certain Web pages, content that best matches the user's data index may be displayed more prominently to the user than other content displayed on the Web page.

The user profile may also be used to create personalized advertisements, marketing materials, entertainment, or educational materials for an individual user. For example, the user's likeness may be altered to reflect the approximate look of specific jewelry, accessories, hairstyles, cuts and coloring, clothing, cosmetics applications, including but not limited to eyebrow pencils, foundations and concealers, the effects of cosmetic applications, including but not limited to cosmetic moisturizers, hair styling products, and self tanning applications, cosmetic procedures, weight loss programs, and other items. The altered image may then be displayed to the user as part of a Web page, print advertisement, email, instant messaging ("IM"), mobile multimedia messaging systems ("MMS"), short messaging systems, or other content on the user's computer, cell phone, PDA, or any other similar electronic device. Clothing may be illustrated on a body image that closely matches the user's body measurements (or clothing sizes) recorded in the user profile. The user's likeness may also be altered to simulate the user in different locations, anatomical poses, and video or audio situations.

A more complete understanding of the Targeted Marketing System and Method will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

FIG. 5 illustrates a preferred database table used for logging user initiated events;

FIG. 6 illustrates an exemplary profile of an individual user stored in the data storage in a preferred embodiment.

DETAILED DESCRIPTION OF THE PREFERRED EMBODIMENTS

The present invention provides a system and method for delivering targeted marketing to online/Internet users, including users of mobile phone technologies, personal digital assistants ("PDA"), iTV applications, instant messaging applications, multimedia messaging applications, short messaging applications (such as text messaging applications) or any similar technology where data is downloaded from interconnected servers. In a preferred embodiment, psychometric information and a photographic likeness or illustrated image of a user are collected for use in personalizing marketing, advertising, entertainment and educational materials, and other content (collectively "content").

In the detailed description that follows, like element numerals are used to describe like elements illustrated in one or more of the aforementioned figures.

Figure 1:
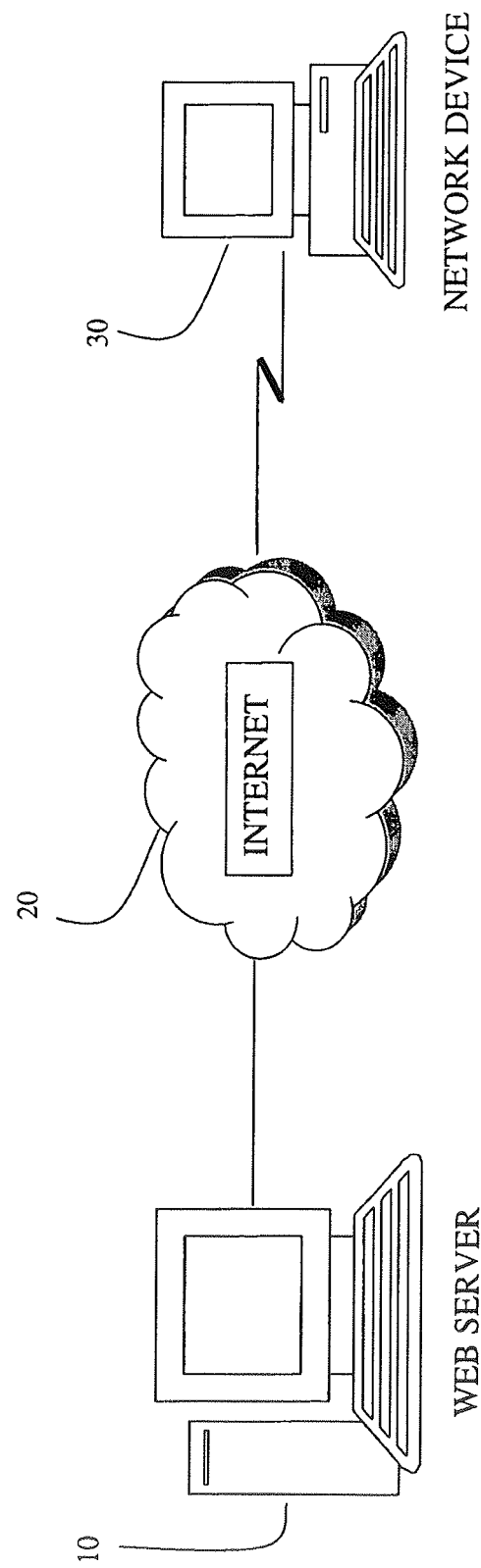
FIG. 1 illustrates a preferred environment for operating the present invention.
Figure 2:
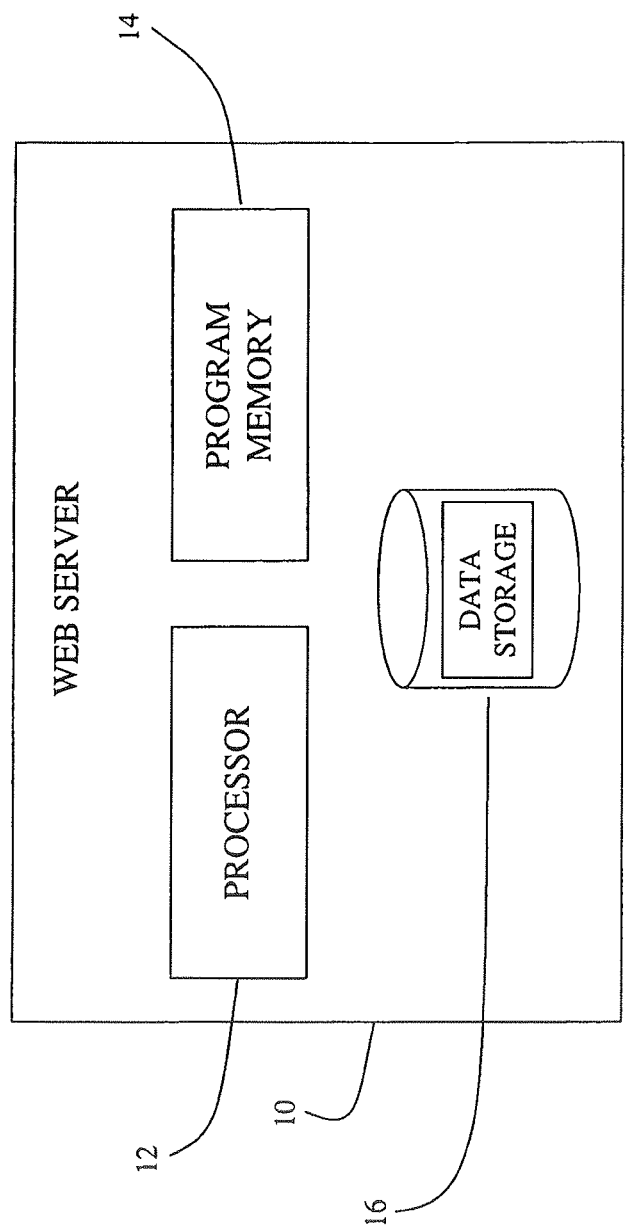
FIG. 2 is a block diagram illustrating the components of a preferred web server.
Figure 3:
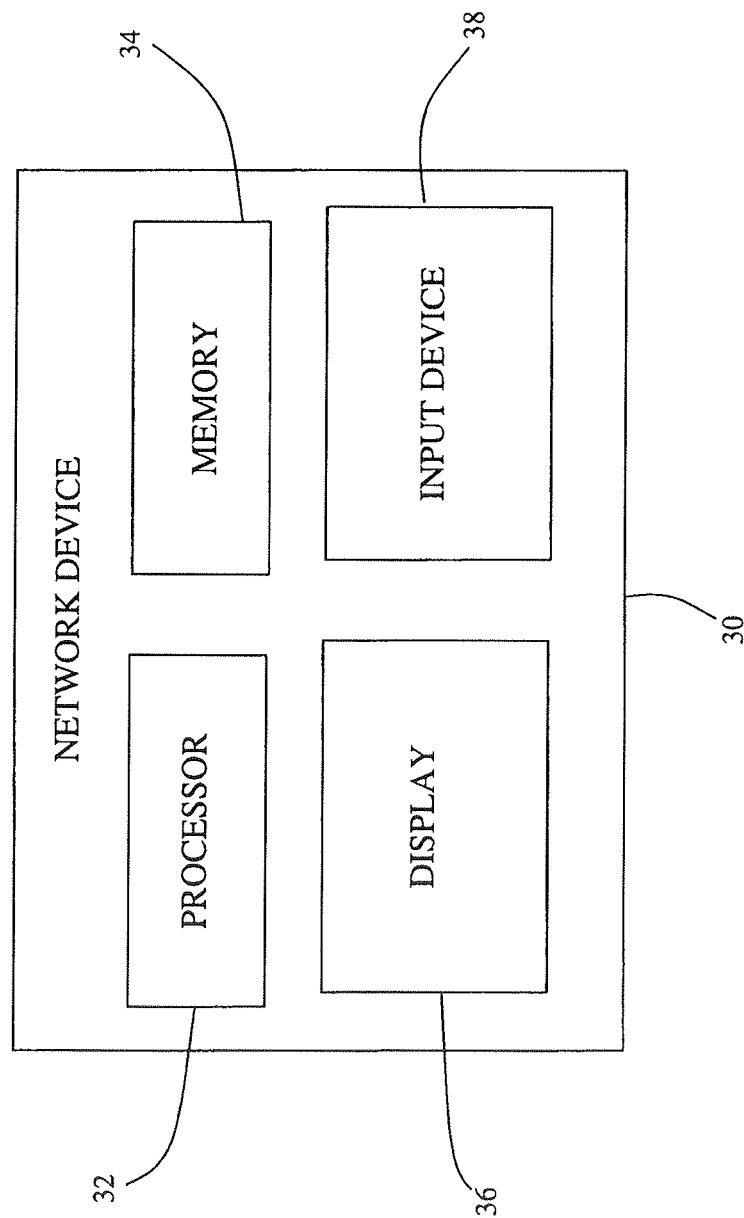
FIG. 3 is a block diagram illustrating the components of a preferred network device.

A preferred embodiment of the present invention is illustrated in FIG. 1, and includes at least one Web server 10 and at least one network device 30 connected through a network 20, such as the Internet. The Web server 10 may be any computing device that provides World Wide Web services on the Internet. As illustrated in FIG. 2, the Web server 10 preferably includes a processor 12, a program memory 14 for storing program instructions, and a data storage 16 for storing targeted content, Web pages, user profile data and other targeted marketing information. The features of the Web server 10 described herein may be embodied on a plurality of computing devices, which may reside in a plurality of locations. The network device 30 is adapted to access and navigate Web pages from the Web server 10 through the Internet 20, and may include a personal computer, a Wireless Application Protocol telephone, or an Internet appliance. As illustrated in FIG. 3, the network device 30 preferably includes a processor 32, a memory 34, a display 36 and an input device 38 such as a mouse and a keyboard.

In operation, a user of the network device 30 accesses Web pages stored on the Web server 10 through a browser application. As known in the art, the Web server 10 may be accessed by entering its Uniform Resource Locator ("URL") into the Web browser. The Web server 10 preferably includes a home page providing links to other user accessible Web pages on the Web server 10, a registration Web page for collecting user profile information from new users, a login Web page for identifying registered users, and stored content. The stored content may include articles, pictures, advertisements, promotions, products and services offered for sale, and other targeted content. In a preferred embodiment, each user is required to register with Web server 10 in order to gain access to certain content stored on the Web server 10. A new user is registered through the registration page, which queries the user for basic demographic information such as name, address, telephone number, age, gender and income. In subsequent visits to the Web server 10, the user may be identified by the Web server 10 through the use of a user name and password, through cookies stored on the network device 30, or any other identification method that links the user to stored data associated with the user.

Figure 4:
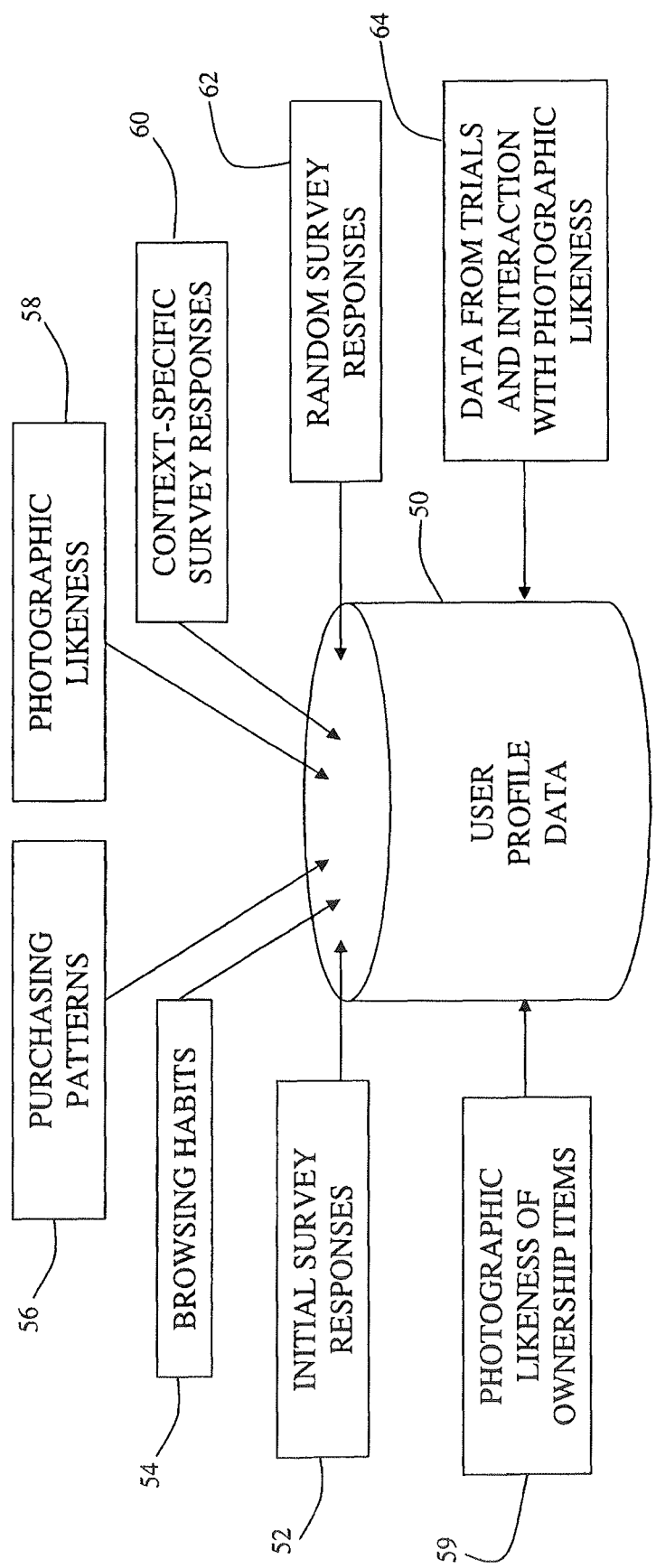
FIG. 4 illustrates a preferred embodiment of user profile data.

The user registration includes the creation of a user profile, which is used by the Web server 10 to store data associated with the registered user. As illustrated in FIG. 4, a preferred user profile data 50 includes initial survey responses 52 provided by the user during registration, data describing the user's browsing habits 54 and purchasing patterns 56, a photographic likeness of the user 58, context-specific survey responses 60, random survey responses 62, and data from product and service trials on and interaction with the photographic likeness 64.

The photographic likeness of the user 58 can be, e.g., the user's photograph or a photographic likeness, including a cartoon likeness or a caricature that is built either by the user employing a photographic-likeness-building software or built by software using information collected from the user (e.g., the user may provide information regarding facial characteristics and hairstyle and/or body type when registering or in response to survey questions and this information can be used by the computer program to build the photographic likeness).

The data from trials and interaction with photographic likeness 64 is obtained, for example, by tracking all of the user's "try on" data, e.g., data collected from the user's interaction with their photographic likeness. By example, every lipstick color or product that a user may have experimented with or "tried" on their own image, or every tie that a user tried on with a suit is tracked and stored in a database. Profiling and predictive modeling systems utilize the user's explicit and implicit preferences to market back those goods and services back to the user on their own image by altering that image.

The data collected in the user profile data 50 is analyzed by the Web server 10 to identify the user's preferences, purchasing habits and computer operation proficiency. The multiple user profiles are analyzed to identify trends and spending habits of the aggregate user group, a subgroup based on various demographic elements, or unique user data. In addition, the user profile data 50 can include a photographic likeness or illustrated image of ownership items of the user 59 (the photographic likeness can be a photograph itself or a likeness built either by the user employing a photographic-likeness-building software or built by software using information collected from the user). Examples of ownership items of the user include, e.g., home exteriors (e.g., the user is given a preview of the home painted a different color, with a new front door, or with new shutters); home interiors (e.g., the user is given a preview of the interior walls of a room painted various colors, the room with different types of floorings installed such as, e.g., hardwood, tile, or carpet; the interior walls of the room arranged with various paintings; or the room arranged with various furniture)(an example is provided in FIG. 14); automobiles (e.g., the user is given a preview of his or her automobile, or desired automobile, with optional equipment installed; or a preview of the automobile painted various colors) (an example is provided in FIG. 17); landscape (e.g., the user is given a preview of the lawn with the addition of new shrubs, or a preview of the yard planted with a different type of grass); pets (e.g., the user is given a preview of his or her pet dressed in clothing such as, e.g., a sweater) (an example is provided in FIG. 20); new makeovers, makeup, hairstyles and fashion accessories (an example is provided in FIGS. 15, 16, 18, 19, 21, and 22); changes in physical appearance of the user (an example is provided in FIGS. 23 and 24); and family or individual family members (e.g. the user is presented with a preview of their family on vacation in Hawaii in a beach scene, or a preview of the family in matching pajamas, or a preview of the family sitting outside of their new home, or a preview of a family member in ski wear and goggles/sunglasses at a ski resort).

In some embodiments, data collected in user profile data 50 is analyzed based on user profiling and predictive modeling to market goods and services to the user that may be of interest to the user based on the user's previous interactions. Input from human consultants may be incorporated in the analysis of user profile data 50 to create a user-specific experience.

In a preferred embodiment, after a user logs onto the Web server 10, the user's actions are tracked until the user logs off or leaves the Web site, either manually or by tracking software known in the art. The user may be tracked by detecting user initiated requests at the Web server 10, by detecting user initiated events through software executing on the user's network device 30 and then transmitting the logged events to the Web server 10, or by other methods known in the art. FIG. 5 illustrates a preferred database table for storing the data describing the user's browsing habits 54. The table includes a sequence of events and the date and time at which each event was detected. The user initiated events that may be tracked include, but are not limited to, selecting a link to a Web page, selecting a link to another Web page, clicking through an advertisement, products and services the user "tries" and experiments with, including Web browsing and survey responses, and printing the current Web page. The user's Web purchases 56 may be tracked in a similar manner, i.e., by logging the date, time and amount of the purchase, an item identifier, the quantity purchased, payment method and shipping address. In addition, the content (e.g., products or services) selected by the user for incorporation within the photographic likeness of the user or the photographic likeness of the user's ownership item may also be tracked. By tracking the content applied to the photographic likeness, the user's preferences are implicitly obtained.

The data describing the user's browsing habits 54, along with the other data from the user profile data 50, is analyzed to prepare a profile of the user's personality, buying motives, interests, activities, opinions and other characteristics. FIG. 6 illustrates an exemplary individual user profile 250 stored in the data storage 16 in a preferred embodiment. The individual user profile 250 includes, e.g., statistics of the individual user (e.g., gender, age group, and hair color), lipstick statistics (e.g., lipstick color preference and lipstick vendor preference), and jewelry statistics (e.g., favorite jewelry and favorite precious stone). The statistics can be obtained from explicit preference indications (e.g., the user's responses to survey or registration questions) or based on implicit preference indications (e.g., tracking the number of times the user asks that a certain type of product (e.g., Sephora red lipstick) or procedure be applied to their photographic likeness). The detailed individual user profile 250 facilitates the marketing of products targeted to the individual user based on the individual user's preferences expressed either explicitly or implicitly.

In a preferred embodiment, market segmentation variables are pre-selected by the content providers based on the target demographics and psychographics each content provider is attempting to reach. The user profile data 50 is then analyzed to determine user values for each of these pre-selected market segmentation variables. For example, the content provider may target its content to a particular Value and Lifestyle Survey (VALS) category. As known in the art, VALS places consumers into one of nine mutually exclusive lifestyle categories based on their psychology and key demographics. These categories have been found to be strong predictors of a variety of consumer preferences in products, services, and media. Other psychographic market segmentation variables may also be used, such as variables describing personality traits (e.g., reserved v. outgoing; dull v. bright; trusting v. suspicious).

Figure 7:
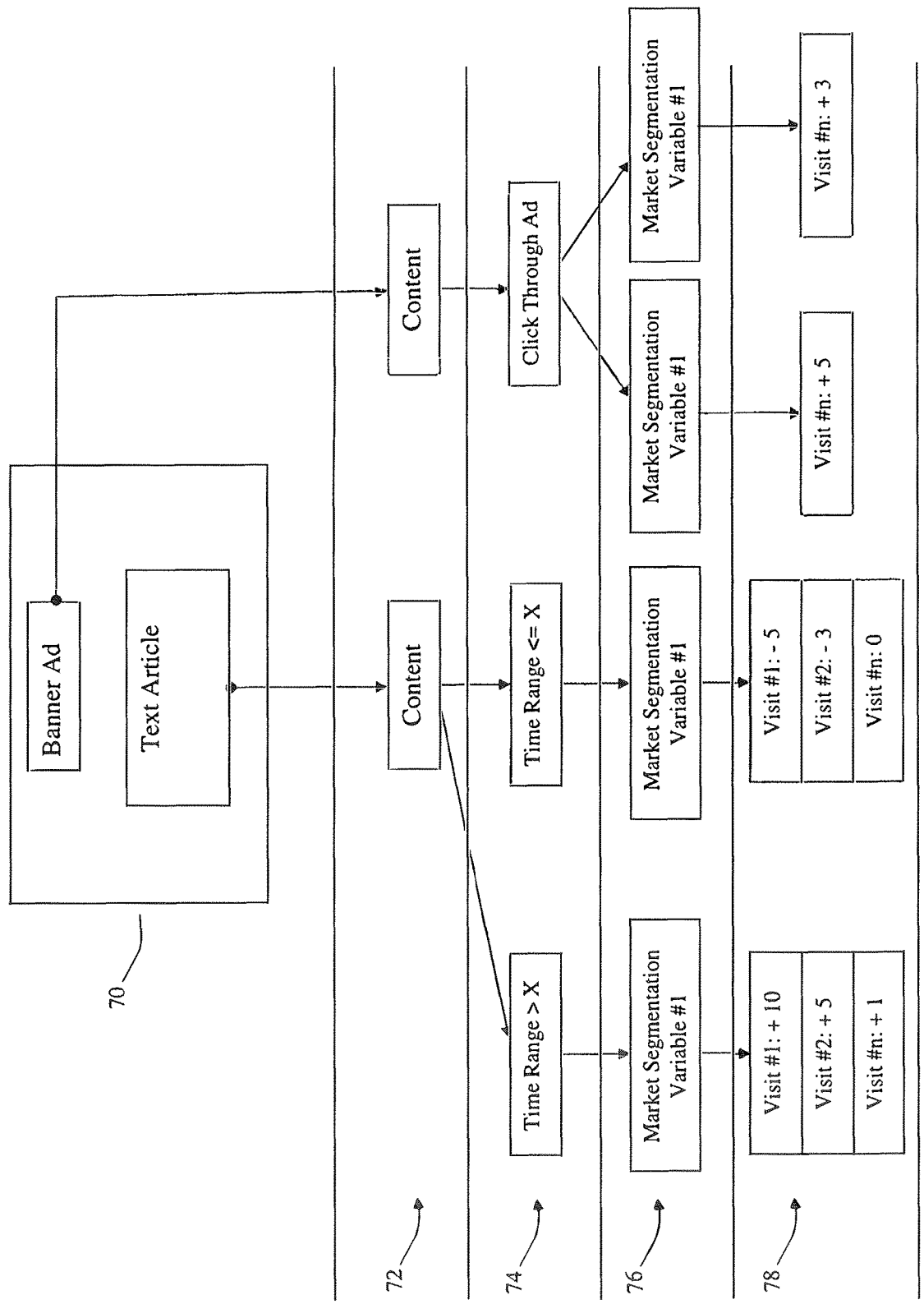
FIG. 7 illustrates the assignment of metric values to user initiated events in a preferred embodiment.

A preferred analysis of the data describing the user's browsing habits 54 will now be described with reference to FIG. 7. Each Web page 70 includes one or more pieces of content 72, which may include text articles, banner ads, pictures, videos, audio files, etc. The user's actions 74 on the Web page 70 provide insights into the user's preferences for the content 72 available on the Web page 70. For example, if the user immediately hits the "Back" button on the user's browser when the Web page 70 is displayed (e.g., the time spent on the Web page 70 is less than a predetermined value X), it could indicate that the user has little interest in the displayed content 72. The web site operator, advertiser, or other entity may select zero or more market segmentation variables 76 to be associated with each piece of content 72. This selection is preferably performed manually by a market researcher to determine the market segmentation variables 76 to associate with the content 72, and the values to give the metrics 78 upon the occurrence of each action. Alternatively, this selection may be performed electronically through market research software known in the art. In a preferred embodiment, each market segmentation variable has a metric value from 0 to +100 that indicates the value of the user action for that market segmentation variable. The assigned metric value may depend on various factors such as the user action and the number of times this user action has been recorded for the particular content.

The data stored in the user profile data 50, such as the user's demographic and psychographic data, may also include an associated confidence factor. In a preferred embodiment, the confidence factor is a decay function that reduces the value of a metric, or the weight given to a data element, over time. A market researcher preferably sets the confidence factor for each data element based on the type of data and the researcher's confidence in the data source. For example, there may be a high level of confidence in a residential address entered by a user for the delivery of items purchased online. In such a scenario the market researcher may remain confident in the accuracy of the address more than one year from the date of entry, and may set the confidence in the data to be reduced 10% every year. The market researcher may have a much lower level of confidence in other data, for example, the user's "favorite movie." Because a user's favorite movie may change frequently over time, the market researcher may set the confidence level to be reduced more often, for example, a reduction of 50% every three months.

Figure 8A:
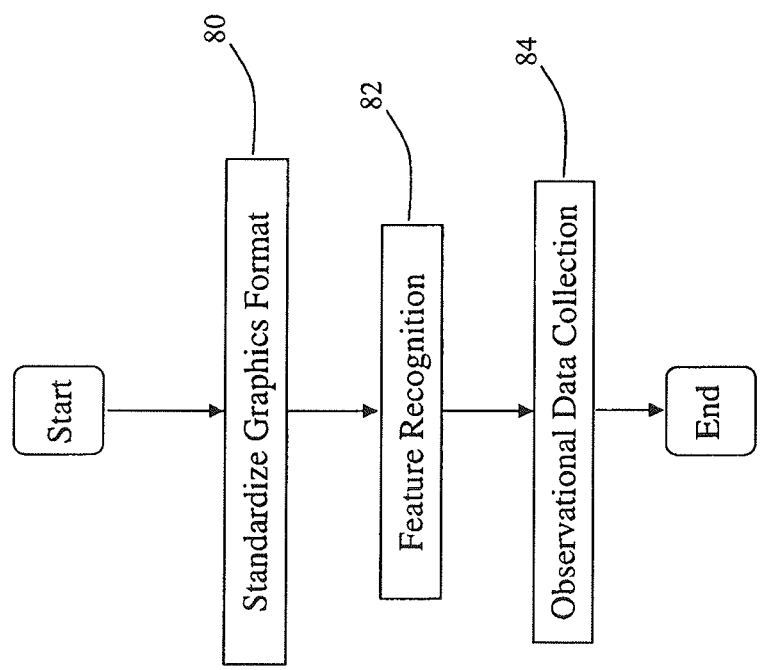
FIGS. 8a-d illustrate a preferred processing of a photographic likeness.

As discussed above, the user is encouraged to transmit the user's photographic likeness 58 or photographic likeness of ownership items of the user 59 to the Web server 10 for storage in the user's profile 50. If the photographic likenesses 58 and 59 are computer graphics files (e.g., JPEG or GIF) then the user may email or otherwise transmit the graphics file to the Web server 10. In a preferred embodiment, the user may alternatively send a photograph to the Web site operator who will create a digital image of the photograph for storage in the user profile. In addition, the user's photograph may be taken using a mobile device such as a cell phone camera, PDA, or any other similar electronic device whereby the image can be transmitted wirelessly to the Web server 10 for storage. Alternatively, the photographic likeness can be built by the user by employing photographic-likeness-building software, or built by software using data collected from the user (e.g., a computer program can gather their facial characteristics and hairstyle information when they register or when responding to survey questions). The photographic likenesses 58 and 59 are processed according to the preferred steps illustrated in FIG. 8*a*.

Figure 8B:
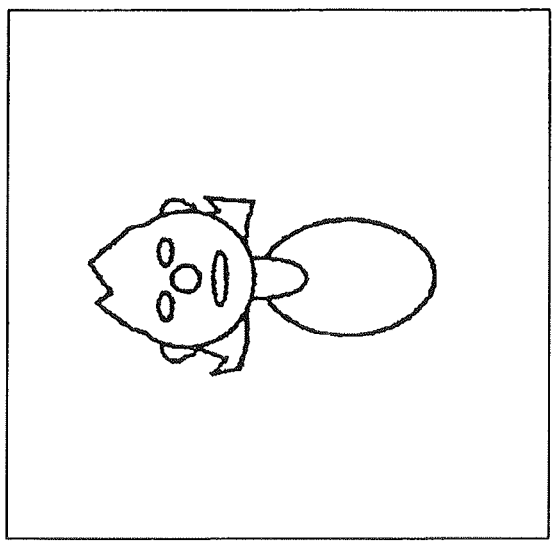

In Step 80, the photographic image is converted to a standard image format. In the preferred embodiment, each image includes a picture of the user's head and shoulders, against a solid background, as illustrated in FIG. 8*b*. Alternatively, the image can include the entire body as shown in FIG. 8*c*. Step 80 may include cropping the image and changing the file size, image dimensions, number of colors and file type. In Step 82, the features of the face or entire body in the photographic likeness 58 are identified. In the preferred embodiment, the location of the user's eyes, eyelids, cheeks, ears, lips, neckline, hairline and other facial features are identified on the two-dimensional image and stored in the user profile data 50. For example, the user's lips can be identified and their size determined from the photographic likeness and if the lips are determined to be small, then the photographic likeness can be altered to demonstrate the user's lips enhanced by a new lip plumping lipstick. Similarly, age spots can be identified on the user's photographic likeness and foundation concealer from a particular company can be applied to cover those age spots. In this way, results of a product or the effects of a treatment such as a laser treatment that removes the spots can be immediately visualized. Also, the user's hairline can be identified on the photographic likeness and if it's determined that the user is balding or otherwise losing hair, then the photographic likeness can be altered to demonstrate hair growth resulting from use of hair restoration products from companies such as, e.g., Bosley Medical. The user profile data may also store any other applicable physical feature of the user. The identification step may be performed manually by a graphics editor, or automatically through facial feature recognition software known in the art. Optionally, the identification by the software can be adjusted manually by the user thus overriding the identification performed by the software. For example, the eye lid area identified by the software can be manually adjusted by the user so that cosmetics for the eye lid is applied only to the area defined by the user. By identifying physical characteristics from the user's photographic likeness, characteristics of the user can be obtained even if the user doesn't respond to survey questions. Metrics can be assigned to the identified physical characteristics. In Step 84, additional data is collected from the picture for storage in the user profile data 50. For example, the user's hair color, eye color, skin tone, face shape, and other information that may be manually determined from the photographic image and recorded in the user profile data 50.

Figure 8D:
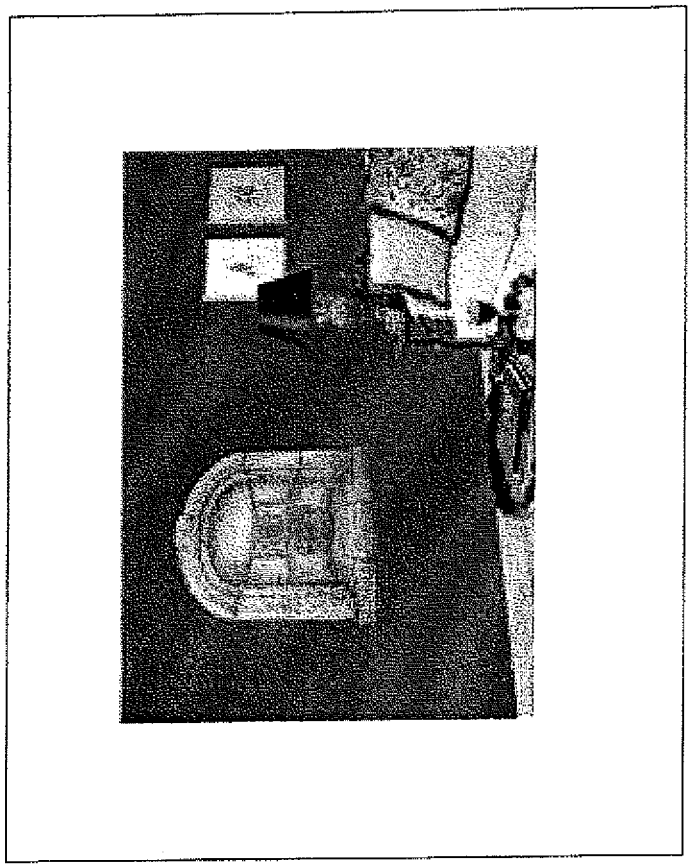
Figure 8C:
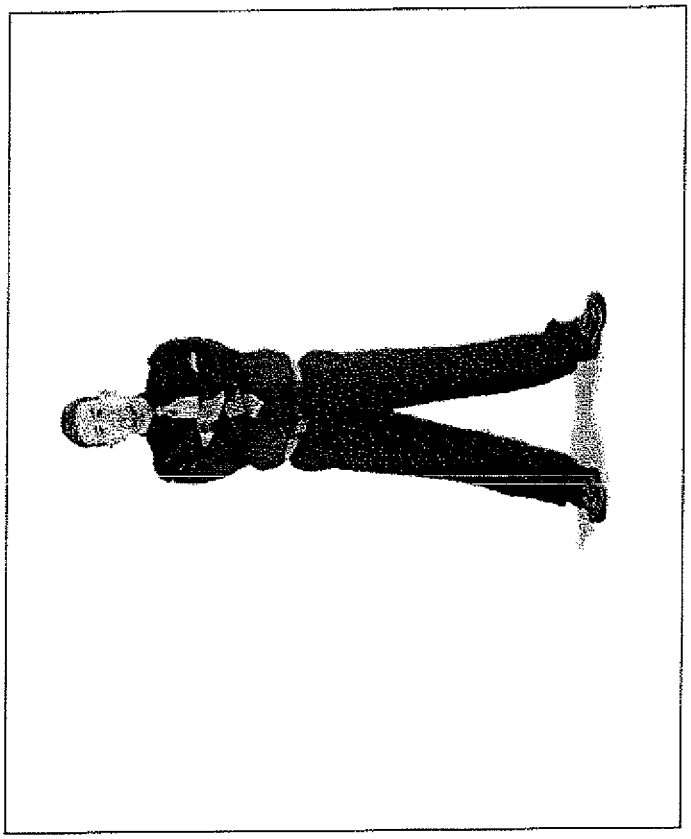

Alternatively, the image can include can include any ownership item, such as the interior of a room as shown in FIG. 8*d*. As before, step 80 may include cropping the image and changing the file size, image dimensions, number of colors and file type. In Step 82, the features of the ownership item in the photographic likeness 59 are identified. As before, the user profile data may also store any other applicable physical feature of the structure or ownership item. The identification step may be performed manually by a graphics editor, or automatically through feature recognition software known in the art. Optionally, the identification by the software can be adjusted manually by the user thus overriding the identification performed by the software. By identifying physical characteristics from the user's photographic likeness 59, characteristics of the ownership item can be obtained even if the user doesn't respond to survey questions. Metrics can be assigned to the identified physical characteristics. In Step 84, additional data is collected from the picture for storage in the user profile data 50. For example, color, shape, structure, and other information that may be manually determined from the photographic image and recorded in the user profile data 50.

Figure 9:
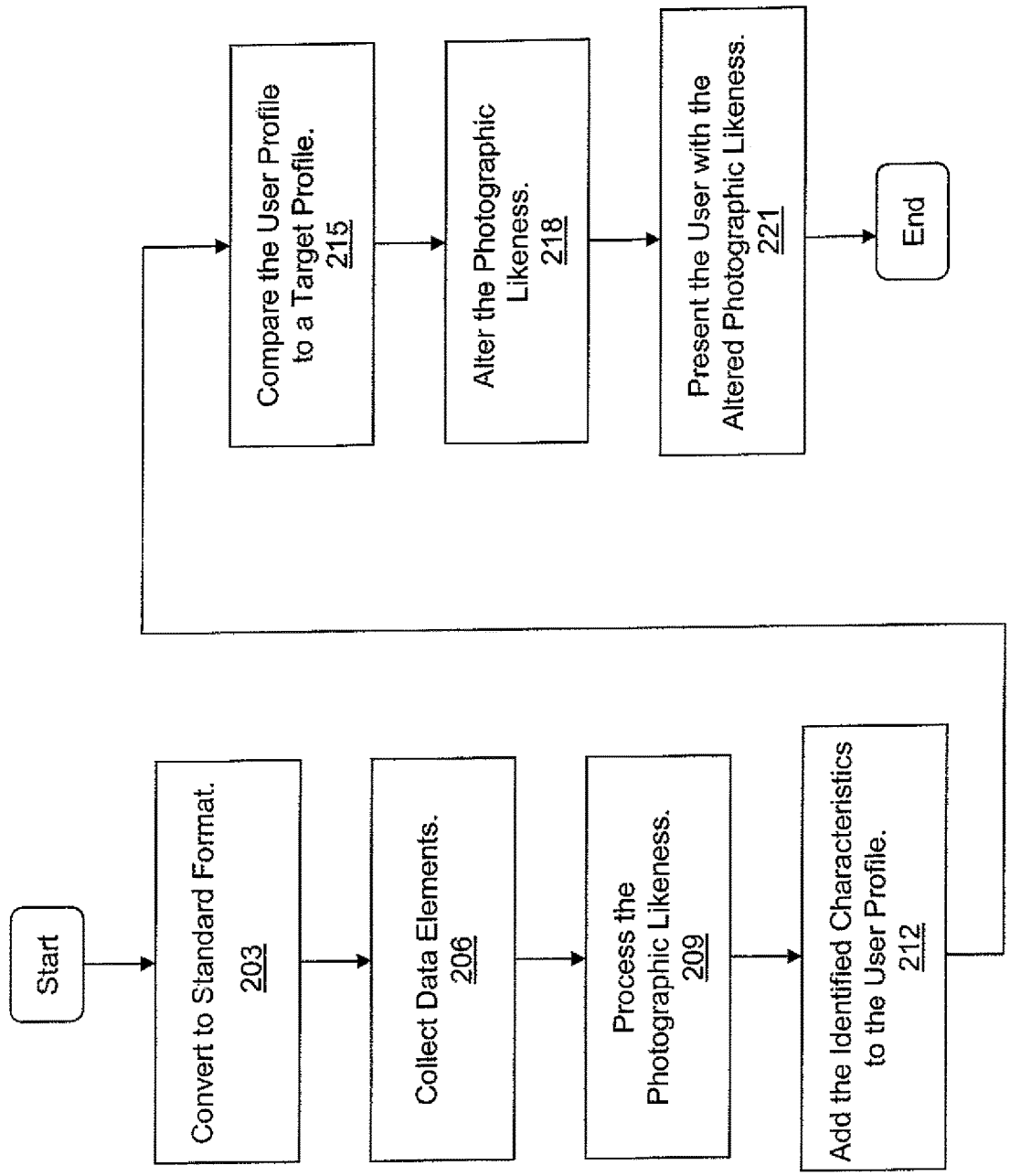
FIG. 9 illustrates a preferred method for targeting to a user marketing content relevant to the user's ownership item.

FIG. 9 illustrates a preferred method for targeting to the user marketing content relevant to the ownership item. In block 203, the photographic likeness is converted to a standard image format. The conversion may include cropping the image and changing the file size, image dimensions, number of colors, and file type. In block 206, data elements are collected and stored in the user profile 50. The data elements can be, e.g., the initial survey responses 52, the context-specific survey responses 60, the random survey responses 62, the browsing habits 54, the purchasing patterns 56, the trials and interactions with the photographic likeness 64 and the photographic likeness of the user 58 and/or the photographic likeness of the user's ownership item 59. The photographic likeness can be collected using various techniques. For example, if the photographic likeness of the ownership item 59 is a computer graphics file (e.g., JPEG or GIF) then the user may email or otherwise transmit the graphics file to the Web server 10. Alternatively, the user may send a photograph of the ownership item to the Web site operator who will create a digital image of the photograph for storage in the user profile. In addition, the user may take a photograph of the ownership item using their camera cell phone or other mobile device and transmit the photograph wirelessly to the Web server 10 for storage. Alternatively, the photographic likeness of the ownership item of the user 59 can be built by the user by employing the photographic-likeness-building software (e.g., software can be used to build the user's room by the user himself or herself to create a visual likeness of their room, or can be built through the data gathered by the user registering or interacting with the surveys and experimenting with different products in the software). As another alternative, photographic likeness 59 can be built by software using data gathered from the user (e.g., the information collected during registration or by tracking can be used to build the photographic likeness of the ownership item). In yet another embodiment, photographic likeness 59 of other ownership items such as pets, jewelry, accessories, etc. can be built using similar software modules.

In block 209, the photographic likeness of the user's ownership item is processed. The processing includes identifying the characteristics of the ownership item in the photographic likeness. This step may be performed manually by a graphics editor, or automatically through feature recognition software known in the art. For example, the number of doors on the automobile or the location of the doors or seats on the automobile, or the color of the walls of a room or the location of the edges of the wall are identified on the two-dimensional image and stored in the user profile data 50. In block 212, the identified characteristics are added to the user profile 50.

In block 215, the user profile 50 is compared with a target profile associated with each content to select content that best matches the user profile. The data elements in the user profile 50 can be assigned metrics and algorithms and these metrics and algorithms are applied to the corresponding market segmentation variables to generate data indices. The data indices indicate, e.g., the user's preferences and habits with respect to each of the market segmentation variables. Alternatively, the data indices can be compared with the target profiles to select the best matching content.

In block 218, the photographic likeness of the user's ownership item is altered to incorporate the selected content. In block 221, the user is presented with the altered photographic likeness of the user's ownership item. Using this process, the user is given a preview of how the selected content looks when applied to the photographic likeness of the user's ownership item (refer to FIG. 14 for an example of altering the photographic likeness of the user's ownership item to apply or incorporate the selected content).

Figure 10:
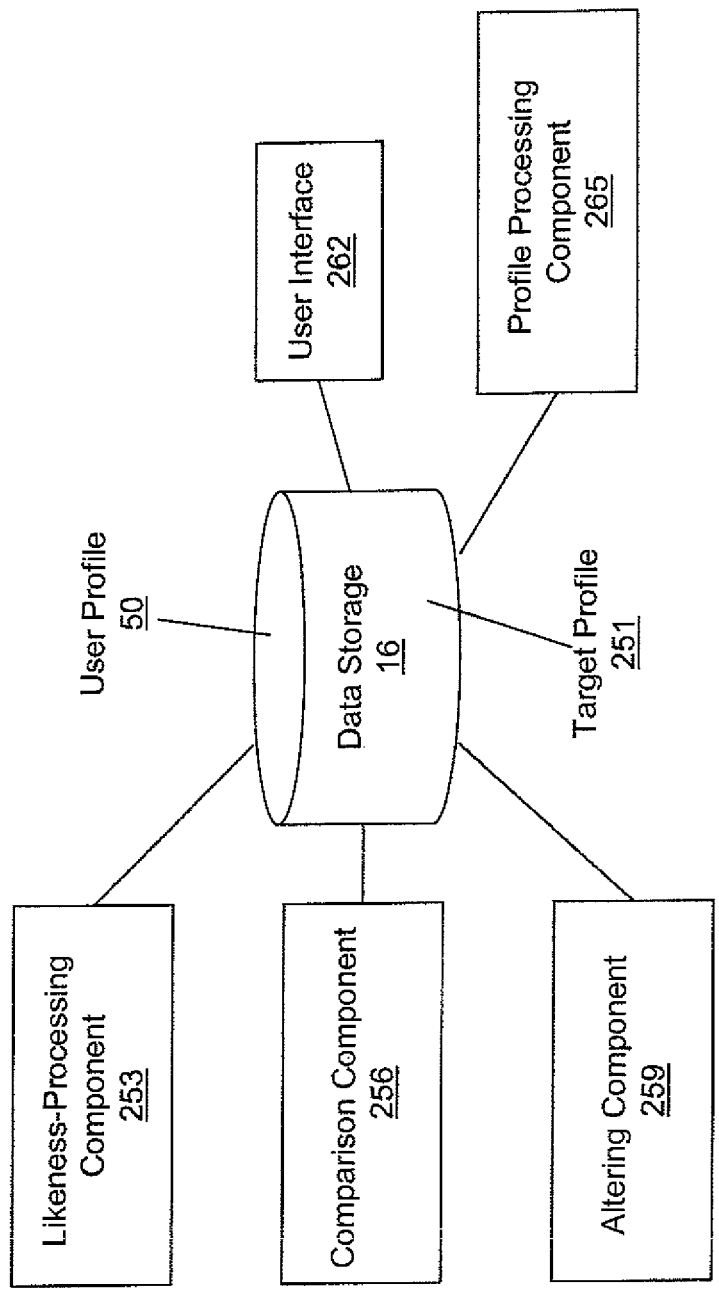
FIG. 10 illustrates a preferred system for targeting to a user marketing content relevant to the user's ownership item.

FIG. 10 illustrates a preferred system for targeting to the user marketing content relevant to the user's ownership item. The components (e.g., program instructions) are, e.g., stored in the program memory 14 and executed on the processor 12. The data storage 16 includes the user profile 50 and a target profile 251. The user profile 50 includes data elements such as, e.g., the initial survey responses 52, the context-specific survey responses 60, the random survey responses 62, the browsing habits 54, the purchasing patterns 56, and the photographic likeness (e.g., the photographic likeness of the user and/or the photographic likeness of the user's ownership item). The target profile 251 is associated with a content and it includes demographics and/or psychographics information specifying the targeted audience. This information is provided by, e.g., an advertiser, promoter or other entity. A likeness-processing component 253 process the photographic likeness of the user's ownership item; e.g., the likeness-processing component 253 identifies characteristics of the user's ownership item. A profile processing component 265 can be used to, e.g., convert the photographic likeness of the user's ownership item to a standard image. The profile processing component 265 can also assign metrics and algorithms to the data elements in the user profile 50 and apply these metrics and algorithms to the corresponding market segmentation variables to generate data indices. A comparison component 256 compares the user profile 50 or the data indices with a target profile 251 associated with each content to select content that best matches the user profile 50. An altering component 259 alters the photographic likeness of the user's ownership item to incorporate the selected content. A user interface 262 (e.g., a computer monitor) presents to the user the altered photographic likeness of the user's ownership item.

Figure 11:
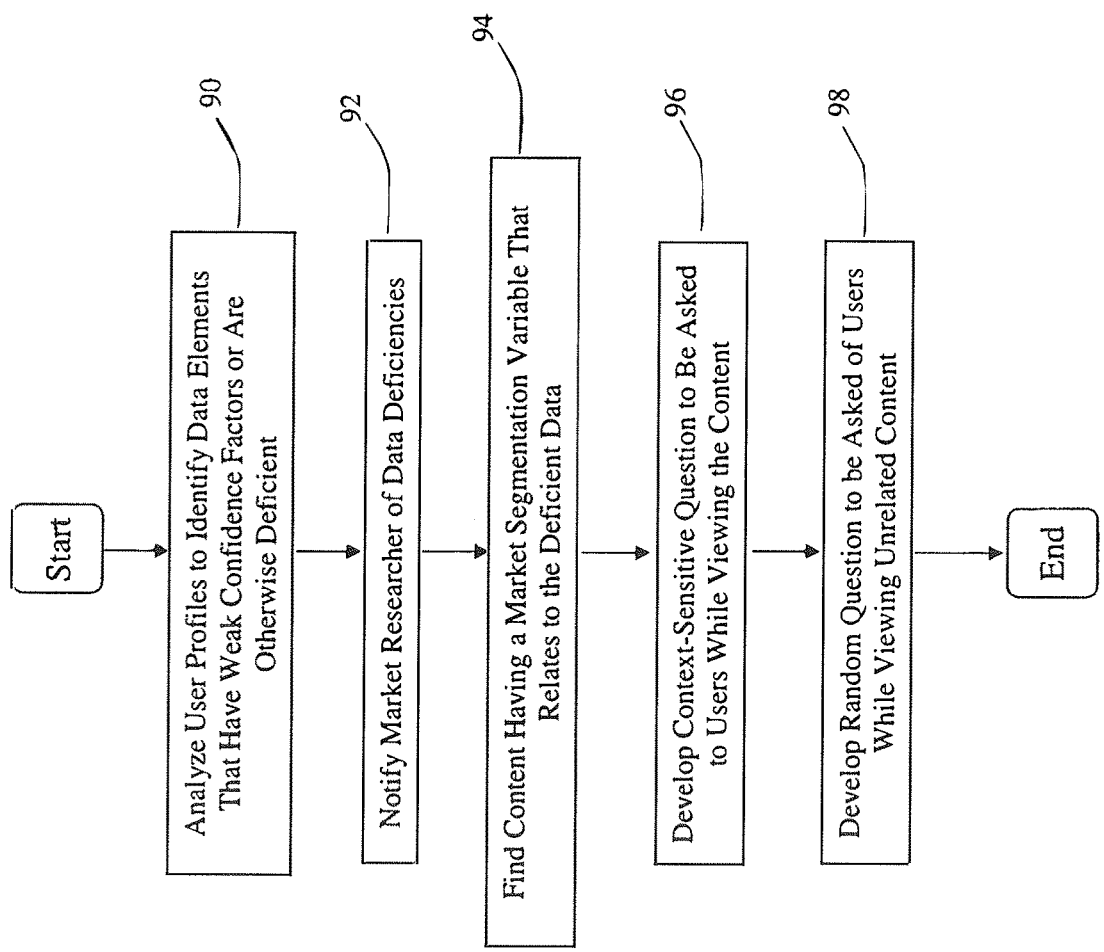
FIG. 11 is a flow diagram illustrating the preferred steps in creating context-sensitive and random survey questions.

Context-specific survey questions and random survey questions are asked periodically to verify weak data elements or supply missing data elements. These survey questions are less intrusive than a lengthy questionnaire and are preferably used throughout the Web site to gather needed information. A preferred embodiment for the implementation of context-specific and random survey questions is illustrated in FIG. 11. First, in Step 90, the user profiles are analyzed in view of the target demographics and psychographics of the available content to identify data elements that have generally weak confidence factors or are otherwise deficient for use in accurately targeting the available content. In a preferred embodiment, this identification of deficient data elements is based on each element's statistical reliability. The market researcher is notified of the deficiencies in the data in Step 92. For each deficient data element, a search is conducted in Step 94 to locate content having an associated market segmentation variable that relates to the deficient data element. In Step 96, the market researcher is prompted to develop a context-specific survey question that relates to the content, the answer to which supplies the deficient data element. For example, if a user is browsing for a pair of shoes, a question asking for the user's shoe size (i.e., the deficient data in this example) would appear to the user as a helpful shoe finding aid, while providing the deficient data about the user. Such web-content refinement inquiries may be used to query for needed information in a relatively non-intrusive manner and will often yield a more accurate user response than other data collection methods. In a preferred embodiment, the context-specific survey question is presented to the user in a new browser window when the associated content is displayed to the user. In Step 98, the market researcher is prompted to develop a random survey question, the answer to which supplies the deficient data element. Random questions may be presented to the user periodically, even while the user is viewing unrelated content.

The number of survey questions, both context-sensitive and random, presented to the user is preferably limited to avoid overburdening the user. In a preferred embodiment, the number of survey questions asked of the user is limited by allowing a predetermined amount of time to pass between each survey question. For example, context-sensitive questions, which are considered less intrusive to the user than random questions, may be skipped until after the passing of a first predetermined interval of time, and random questions, which are considered more intrusive to the user, may be asked after the passing of a second predetermined interval of time, which is longer than the first predetermined interval of time.

Through the data collection methods described above, the user profile data 50 may include the user's personal contact information and demographic information, two or three dimensional images of the user, audio of the user, video of the user, the user's body measurements, purchasing habits, purchasing history, entertainment preferences, lifestyle habits, political beliefs, affiliations, religious beliefs, opinions about specific marketing, advertising, entertainment or educational materials, opinions about current news and cultural issues, web surfing habits, and other information that describes the user. It will be appreciated that the use of the data collection procedures described herein does not preclude the collection of data through other methods, such as telephone surveys.

Figure 12:
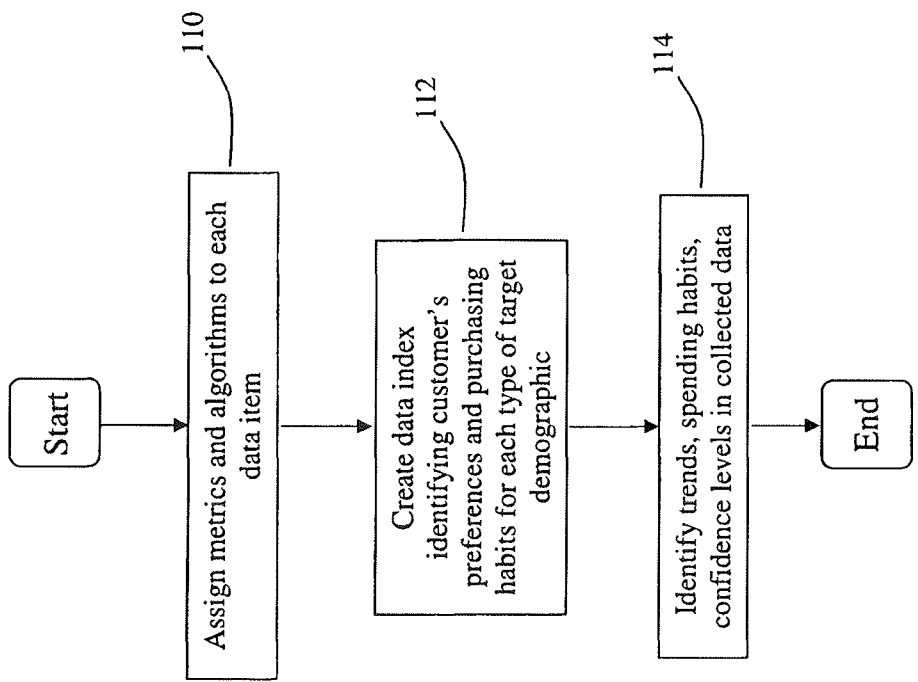
FIG. 12 is a flow diagram illustrating the preferred step of analyzing user profile data.

The collected data in the user profile data 50 is used to target specific content to the user as illustrated in FIG. 12 (and as discussed above with reference to FIG. 7). In Step 110, each data item is assigned metrics and algorithms, and the results are used in Step 112 to create a data index identifying the user's preferences, habits, etc., with respect to each particular target demographic or psychographic type being used by the content providers. When selecting content to display to the user, the Web server will automatically select the content with target demographics and psychographics that best matches the user's data index. In addition, on certain Web pages, content that best matches the user's data index is displayed more prominently to the user than other content displayed on the Web page. For example, an advertisement may be prominently displayed to certain targeted users on the top of a Web page and placed on the bottom of the screen for other users. Further, Web links displayed on the Web page may be arranged in an order that best illustrates the user's preferences for the links.

Figure 13:
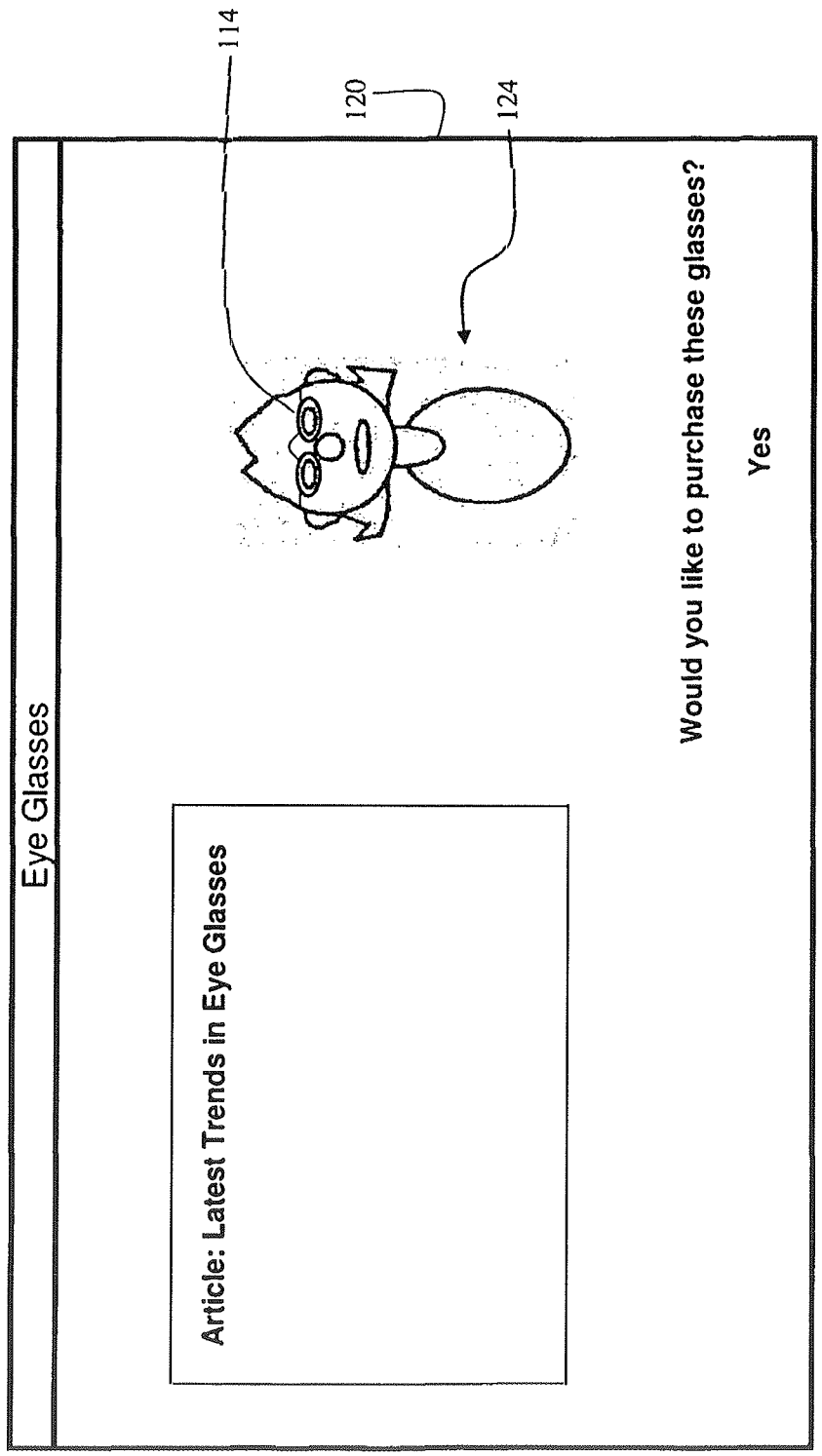
FIG. 13 illustrates one example of the incorporation of a photographic likeness into content.

In the preferred embodiment, the collected and analyzed data, including the psychographic information and the user's photographic likeness, are also used to create personalized advertisements, marketing materials, entertainment, or educational materials for an individual user. The customer may be identified by reading a client identifier on the customer's machine, in the form of a cookie, a machine authentication code and IP address, a username and login, or any other method as known in the art. An example of a targeted promotion is illustrated in FIG. 13. A Web page 120 includes an article 122 describing the latest trends in eyeglasses, and the photographic likeness of the user 124. Using user profile information, a pair of eyeglasses is selected from the article that best match the user's skin tone, face shape and purchasing habits. The eyeglasses 126 are incorporated into the image allowing the user to see how the eyeglasses would look on the user's face. The eyeglasses are placed on the user's face in accordance with the location of the user's eyes, nose and ears, identified when the photographic likeness was first processed. The user may also be given the option of viewing other eyeglasses on the image.

Figure 23:
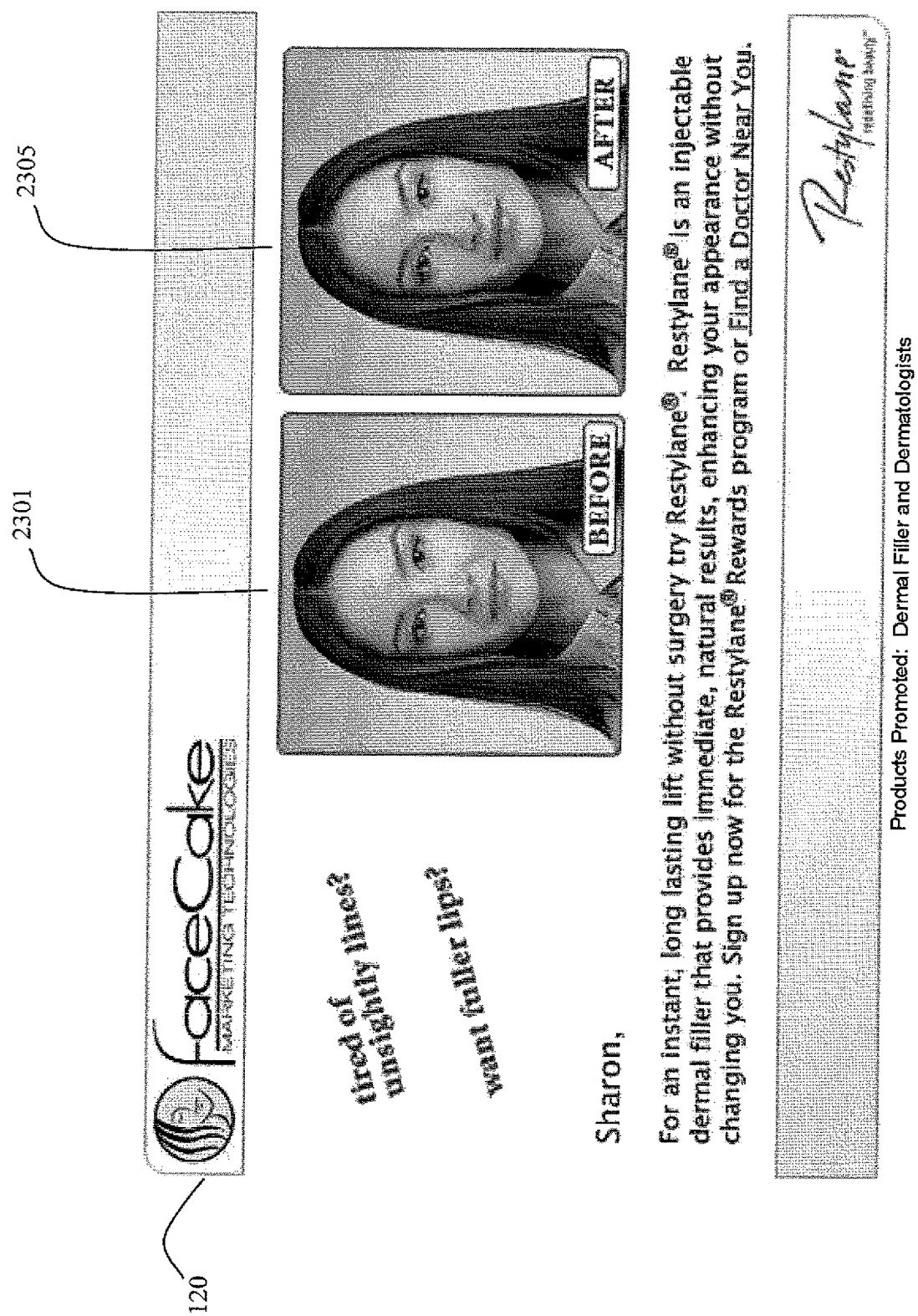
FIG. 23 illustrates an example of altering the photographic likeness of an ownership item of the user.
Figure 24:
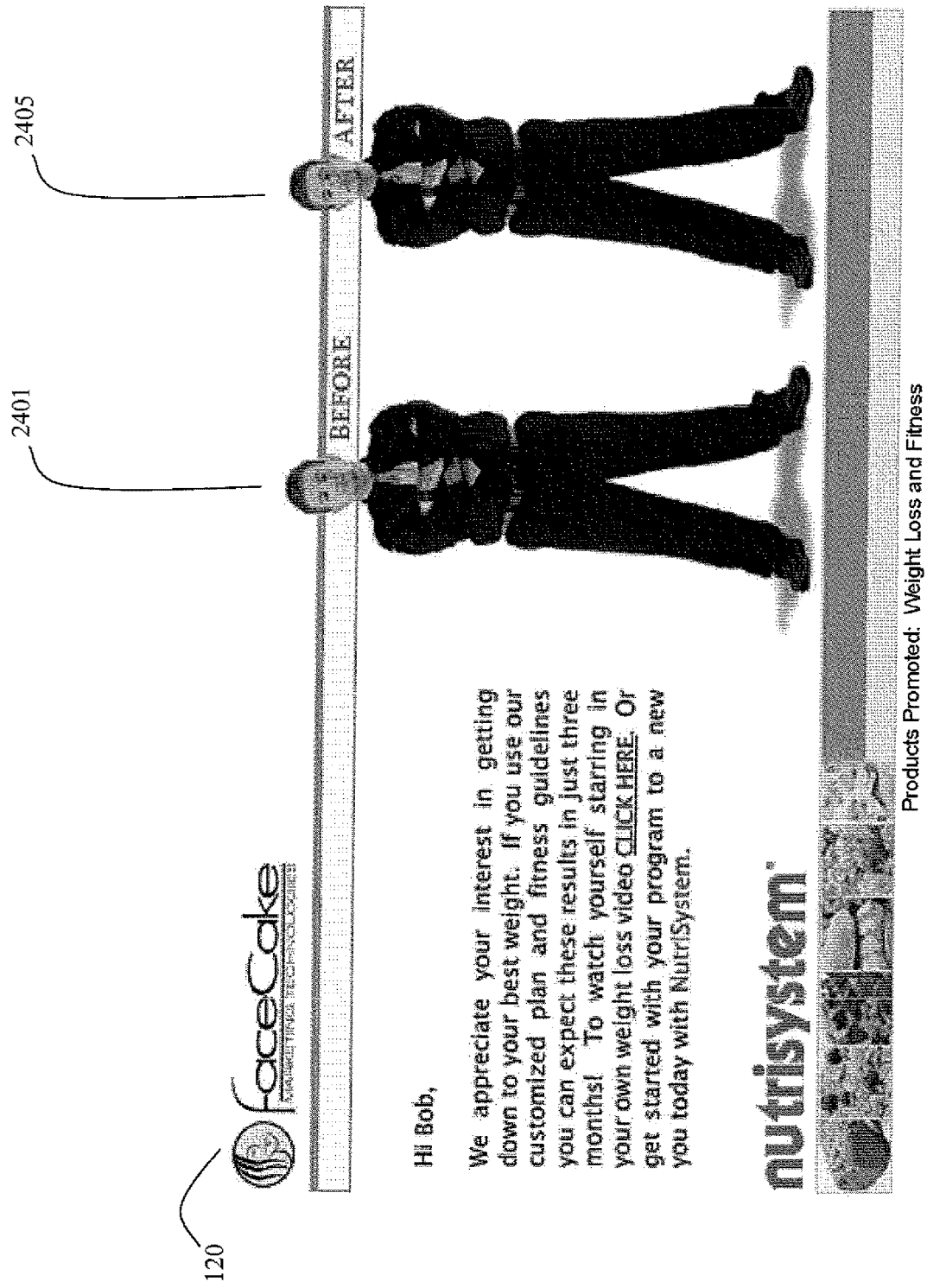
FIG. 24 illustrates an example of altering the photographic likeness of an ownership item of the user.

In another contemplated embodiment, the user's photographic likeness is used to present cosmetic recommendations to the user. A beauty expert can provide the logic which the software uses to automatically apply makeup to the user's photographic likeness. The cosmetics are then applied to the user's image as part of a personalized advertisement for the cosmetics. The advertisement may include an interface allowing the user to select and view different shades and colors, and make online purchases. In addition, the photographic likeness can be altered to simulate the results of cosmetic procedures; for example, the photographic likeness can be altered to show the removal of age spots, results of a facelift, injection of dermal fillers (e.g., lip size can be increased by injecting Restylane, as shown in FIG. 23). Further, the photographic likeness of the user can be altered to show a decrease or an increase in the user's weight due to the use of weight loss or weight gain products, can be used to produce holographic images, or can be used to simulate a photographic likeness that talks. Similarly, the photographic likeness can be altered to show a different body type; e.g., a user's pear shaped body can be altered to demonstrate the user with a hour-glass shaped body resulting from, e.g., following a tailored exercise regimen developed by Bally Total Fitness (e.g. as shown in FIG. 24). Also, the photographic likeness can be altered to simulate hair growth or hair loss which can be used to demonstrate, e.g., the effectiveness of hair restoration products from companies such as, e.g., Bosley Medical. In other embodiments, the user's likeness may be altered to reflect the approximate look of specific jewelry, accessories (e.g., glasses, hats, and scarves as shown in FIGS. 15, 16, 18, and 22), hairstyles, clothing, and other items. Clothing may be illustrated on a body image that closely matches the user's body measurements (or clothing sizes) recorded in the user profile. The photographic likeness can be altered to show the effects of aging and deaging. The user's likeness may also be altered to simulate the user in different locations, anatomical poses, and video or audio situations. For example, an advertisement for a ski vacation may include an action image of the user skiing down a mountain. In addition, an advertisement or promotion may inlay the photographic likeness of the user at a certain place, setting, or background to, e.g., promote a vacation destination, locale, or activity.

Figure 14:
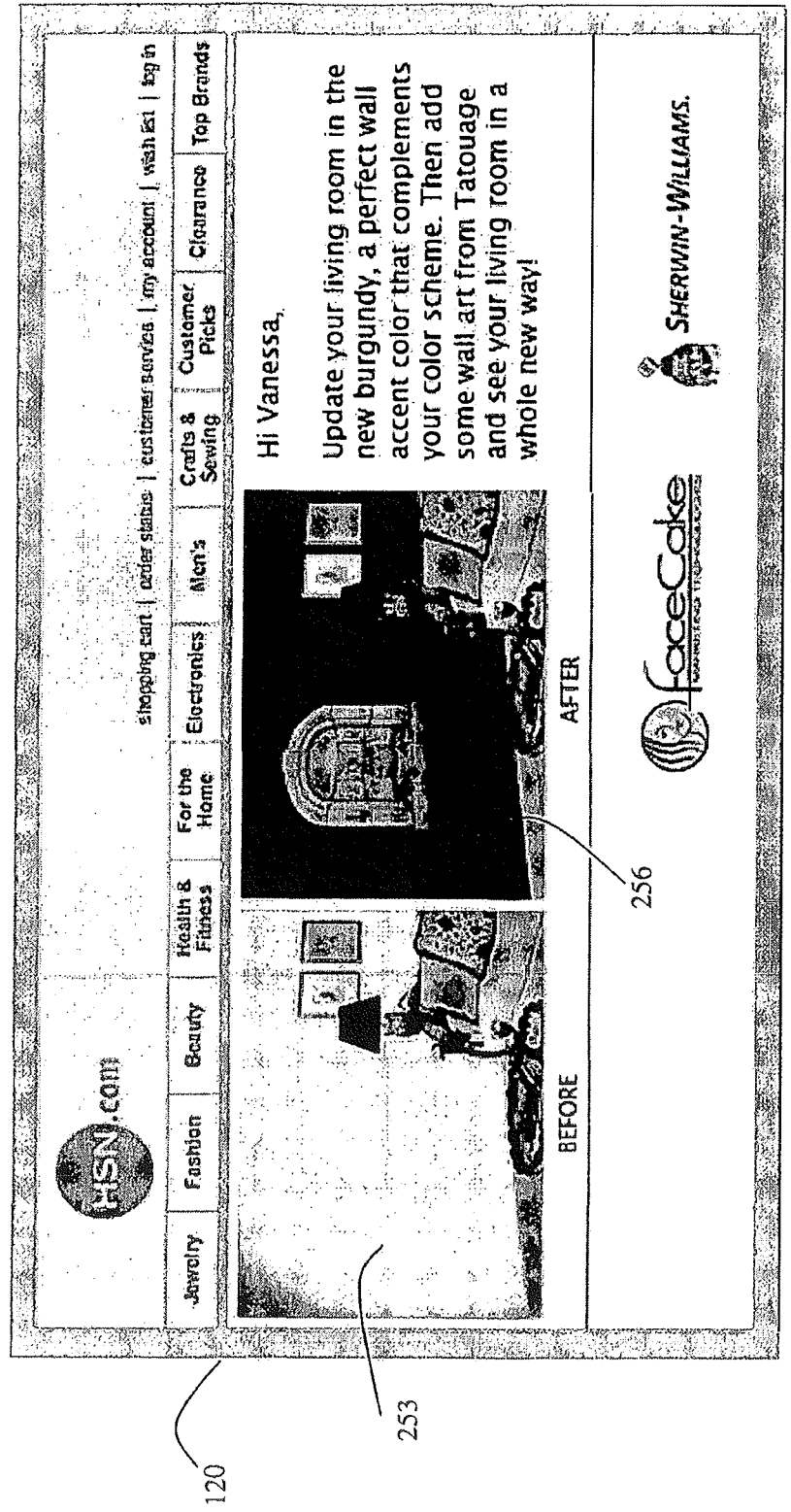
FIG. 14 illustrates an example of altering the photographic likeness of an ownership item of the user.

FIG. 14 illustrates an example of altering the photographic likeness of the user's ownership item. A Web page 120 includes a photographic likeness of the user's living room 253. The photographic likeness of the user's living room 253 is altered using the user's preferences stored in the user profile 50 to provide an altered photographic likeness of the user's living room 256 which incorporates products from advertising clients that adhere to the user's preferences. The altered photographic likeness of the user's living room 256 allows the user to preview the living room incorporating products of possible interest to the user and that adhere to the user's preferences. In the specific example shown in FIG. 14, the altered photographic likeness of the user's living room 256 incorporates burgundy wall paint from Sherwin-Williams (the advertising client) and wall art from Tatouage (another advertising client). In addition, the user may be given the option of incorporating other products (e.g., a different color of wall paint, a new couch, or a new lamp) within the altered photographic likeness of the user's living room 256.

Figure 15:
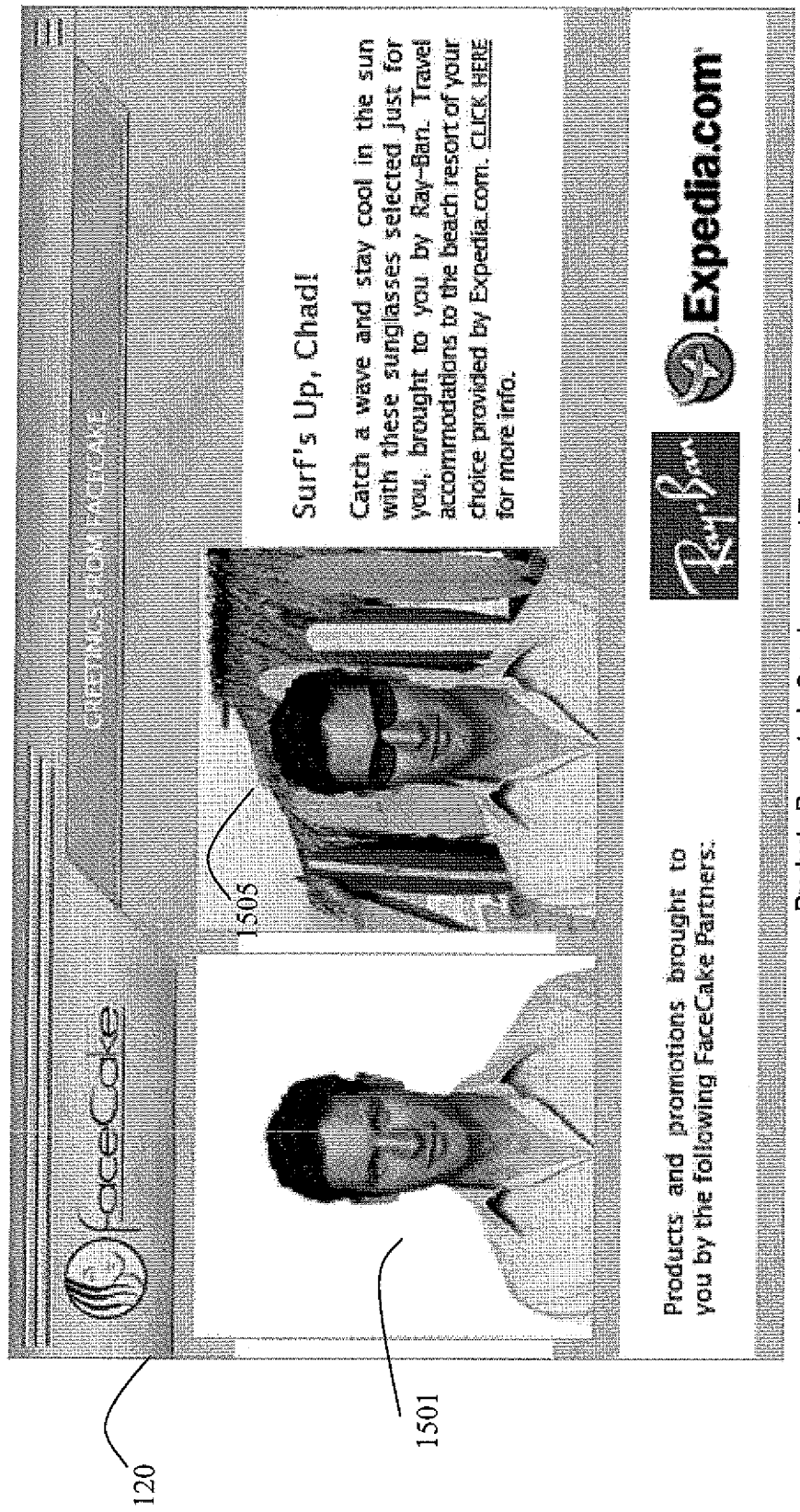
FIG. 15 illustrates an example of altering the photographic likeness of an ownership item of the user.

FIG. 15 illustrates another example of altering the photographic likeness of the user's ownership item. A Web page 120 includes a photographic likeness of the user 1501. The photographic likeness of the user 1501 is altered using the user's preferences stored in the user profile 50 to provide an altered photographic likeness of the user wearing sunglasses 1505, which incorporates products from advertising clients that adhere to the user's preferences. The altered photographic likeness of the user 1505 allows the user to preview himself (or herself) incorporating products of possible interest to the user and that adhere to the user's preferences. In the specific example shown in FIG. 15, the altered photographic likeness of the user 1505 incorporates Ray-Ban sunglasses (the advertising client). The altered photographic likeness of user 1505 includes, for example, a beach scene background, suggesting that the user book a beach vacation online using Expedia.com (another advertising client). In this manner, background imagery may be used to enhance targeted marketing capabilities. In addition, the user may be given the option of incorporating other products (e.g., swimwear, sun tan lotion, etc.) within the altered photographic likeness of the user 1505.

Figure 16:
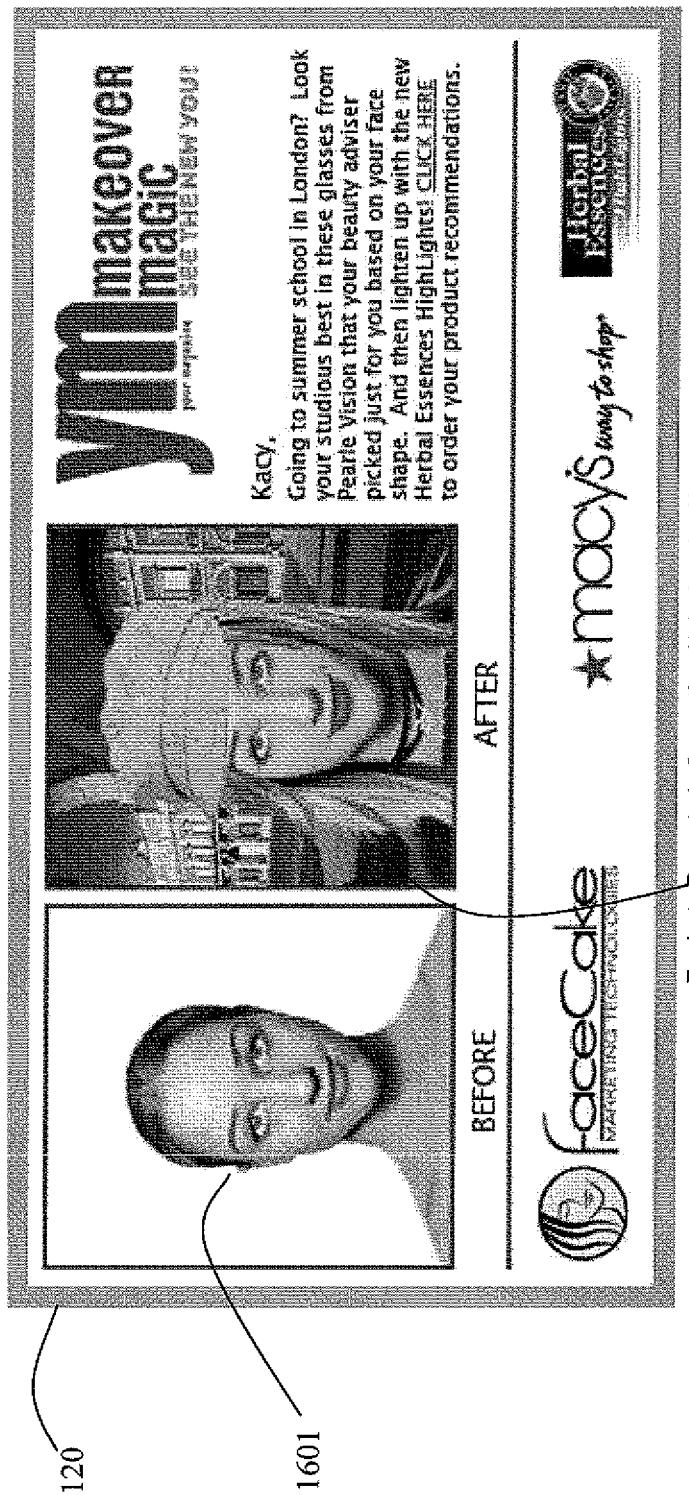
FIG. 16 illustrates an example of altering the photographic likeness of an ownership item of the user.

FIG. 16 illustrates another example of altering the photographic likeness of the user's ownership item. A Web page 120 includes a photographic likeness of the user 1601. The photographic likeness of the user 1601 is altered using the user's preferences stored in the user profile 50 to provide an altered photographic likeness of the user with highlights in her hair 1605, which incorporates products from advertising clients that adhere to the user's preferences. The altered photographic likeness of the user 1605 allows the user to preview herself incorporating products of possible interest to the user and that adhere to the user's preferences. In the specific example shown in FIG. 16, the altered photographic likeness of the user 1605 incorporates Herbal Essences hair products (the advertising client) and recommends purchasing the product at Macy's (another advertising client). In addition, the user may be given the option of incorporating other products (e.g., hats, sweaters, necklaces, accessories, etc.) within the altered photographic likeness of the user 1605.

Figure 17:
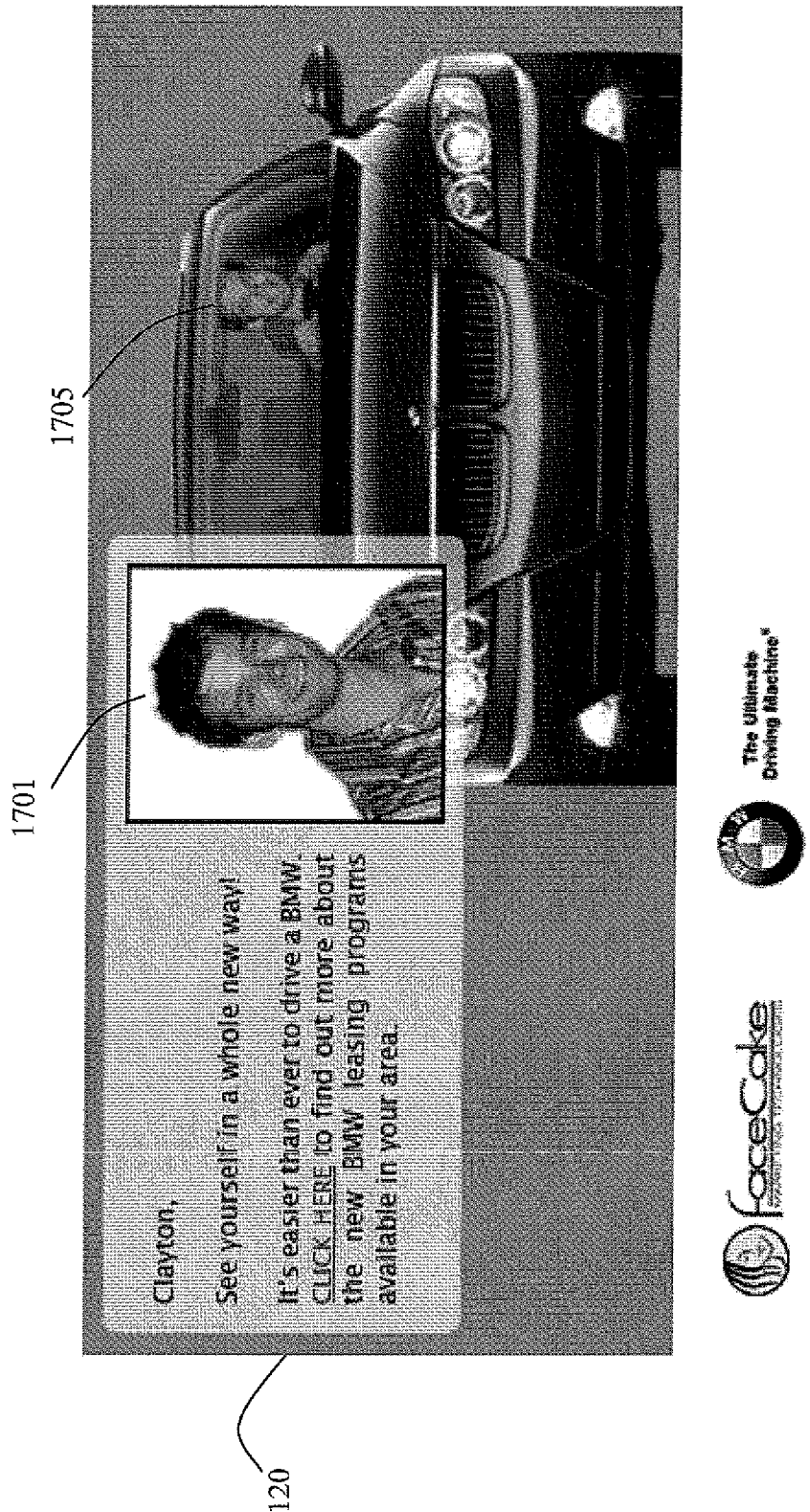
FIG. 17 illustrates an example of altering the photographic likeness of an ownership item of the user.

FIG. 17 illustrates another example of altering the photographic likeness of the user's ownership item. A Web page 120 includes a photographic likeness of the user 1701. The photographic likeness of the user 1701 is altered using the user's preferences stored in the user profile 50 to provide an altered photographic likeness of the user in a BMW vehicle 1705, which incorporates products from advertising clients that adhere to the user's preferences. The altered photographic likeness of the user 1705 allows the user to preview himself incorporating products of possible interest to the user and that adhere to the user's preferences. In the specific example shown in FIG. 17, the altered photographic likeness of the user 1705 incorporates BMW vehicles (the advertising client) and recommends purchasing the vehicle at a BMW dealer in the user's area.

Figure 18:
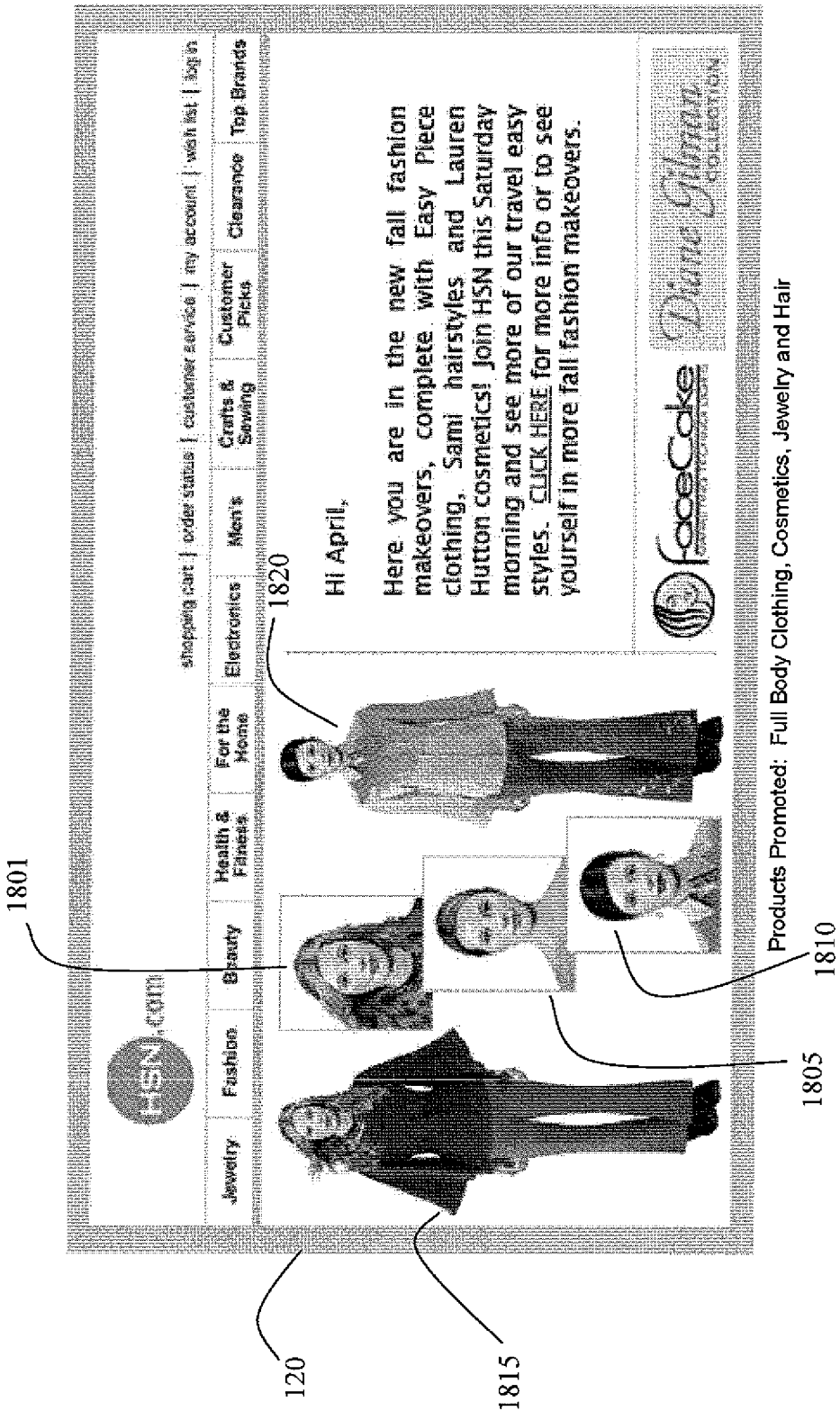
FIG. 18 illustrates an example of altering the photographic likeness of an ownership item of the user.

FIG. 18 illustrates yet another example of altering the photographic likeness of the user's ownership item. A Web page 120 includes a photographic likeness of the user 1801. The photographic likeness of the user 1801 is altered using the user's preferences stored in the user profile 50 to provide an altered photographic likeness of the user with new hairstyles 1805, 1810 and new clothes 1815, 1820, which incorporates products from advertising clients that adhere to the user's preferences. The altered photographic likeness of the user 1805, 1810, 1815, and 1820 allows the user to preview herself incorporating products of possible interest to the user and that adhere to the user's preferences. In the specific example shown in FIG. 18, the altered photographic likeness of the user 1805, 1810, 1815, and 1820 incorporates Easy Piece clothing, (the advertising client) Sami hairstyles, (another advertising client) and Lauren Hutton cosmetics (yet another advertising client).

Figure 19:
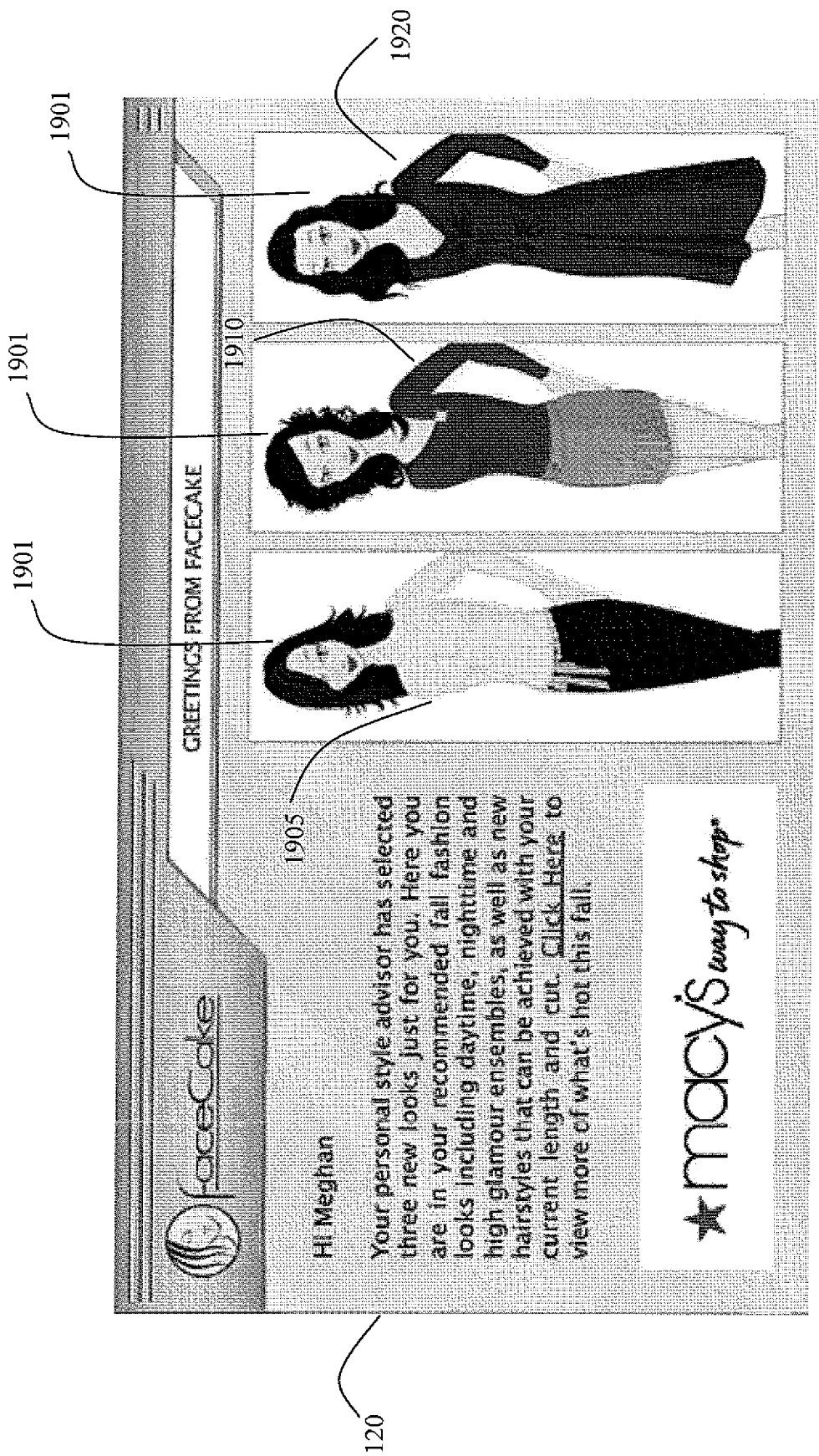
FIG. 19 illustrates an example of altering the photographic likeness of an ownership item of the user.

FIG. 19 illustrates yet another example of altering the photographic likeness of the user's ownership item. A Web page 120 includes an illustrated image or cartoon likeness of the user 1901. The illustrated image likeness of the user is altered using the user's preferences stored in the user profile 50 to provide images of the user in new fashion ensembles of the user 1905, 1910, and 1920, which incorporates products from advertising clients that adhere to the user's preferences. The altered illustrated likeness of the user 1905, 1910, and 1920 allow the user to preview herself incorporating products of possible interest to the user and that adhere to the user's preferences. In the specific example shown in FIG. 19, the altered illustrated likeness of the user 1905, 1910, and 1920 incorporates fall fashion looks for daytime, nighttime, and high glamour ensembles from Macy's (the advertising client). In addition, the user may be given the option of incorporating other products (e.g., hairstyles, belts, brooches, necklaces, accessories, etc.) within the altered illustrated image likeness of the user 1905, 1910, and 1920.

Figure 20:
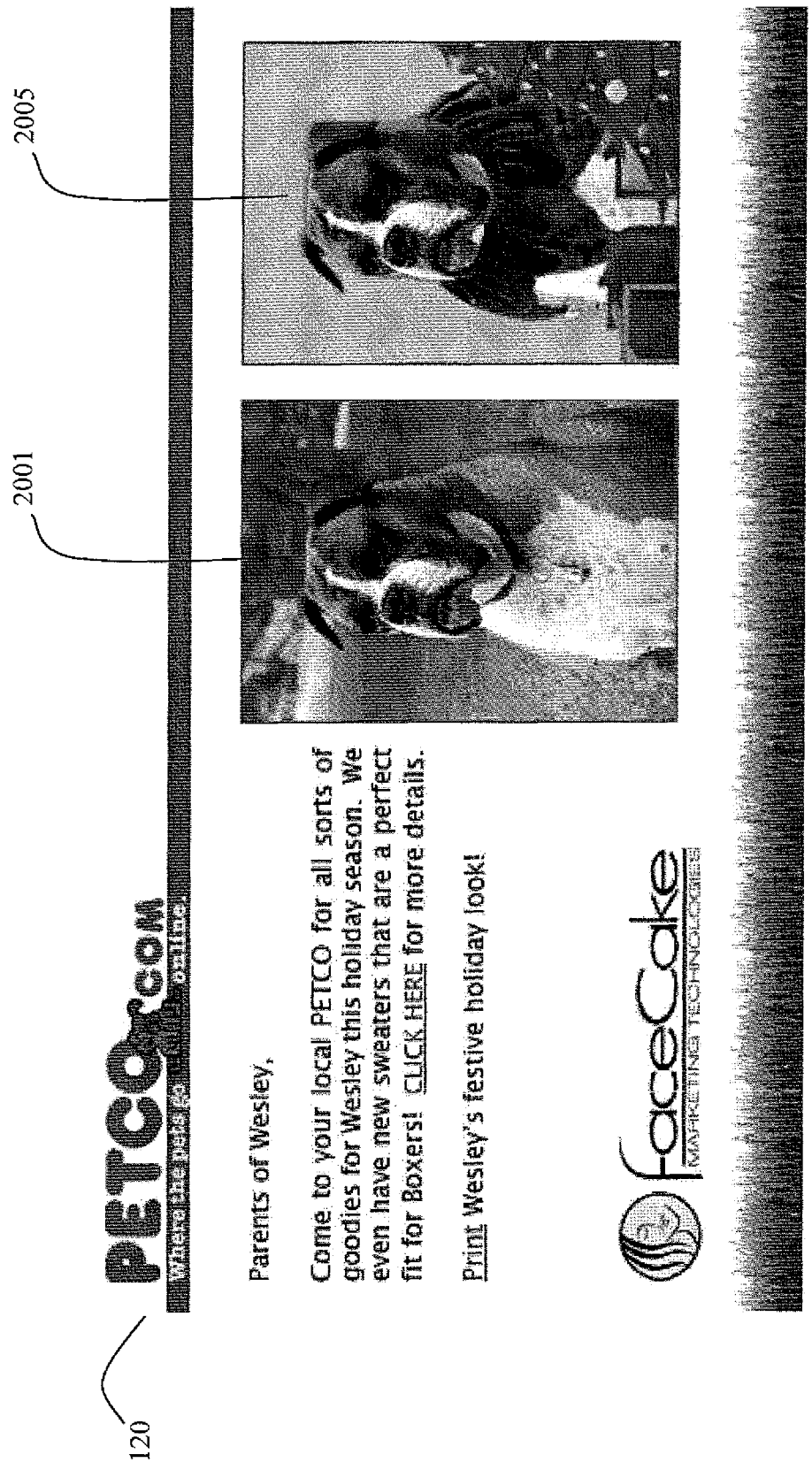
FIG. 20 illustrates an example of altering the photographic likeness of an ownership item of the user.

FIG. 20 illustrates another example of altering the photographic likeness of the user's ownership item. A Web page 120 includes a photographic likeness of the user's pet 2001. The photographic likeness of the user's pet 2001 is altered using the user's preferences stored in the user profile 50 to provide an altered photographic likeness of the user's pet with a holiday sweater 2005, which incorporates products from advertising clients that adhere to the user's preferences. The altered photographic likeness of the user's pet 2005 allows the user to preview her (or his) pet incorporating products of possible interest to the user and that adhere to the user's preferences. In the specific example shown in FIG. 20, the altered photographic likeness of the user's pet 2005 incorporates products from PETCO.com (the advertising client). In addition, the user may be given the option of incorporating other products (e.g., hats, collars, accessories, etc.) within the altered photographic likeness of the user's pet 2005.

Figure 21:
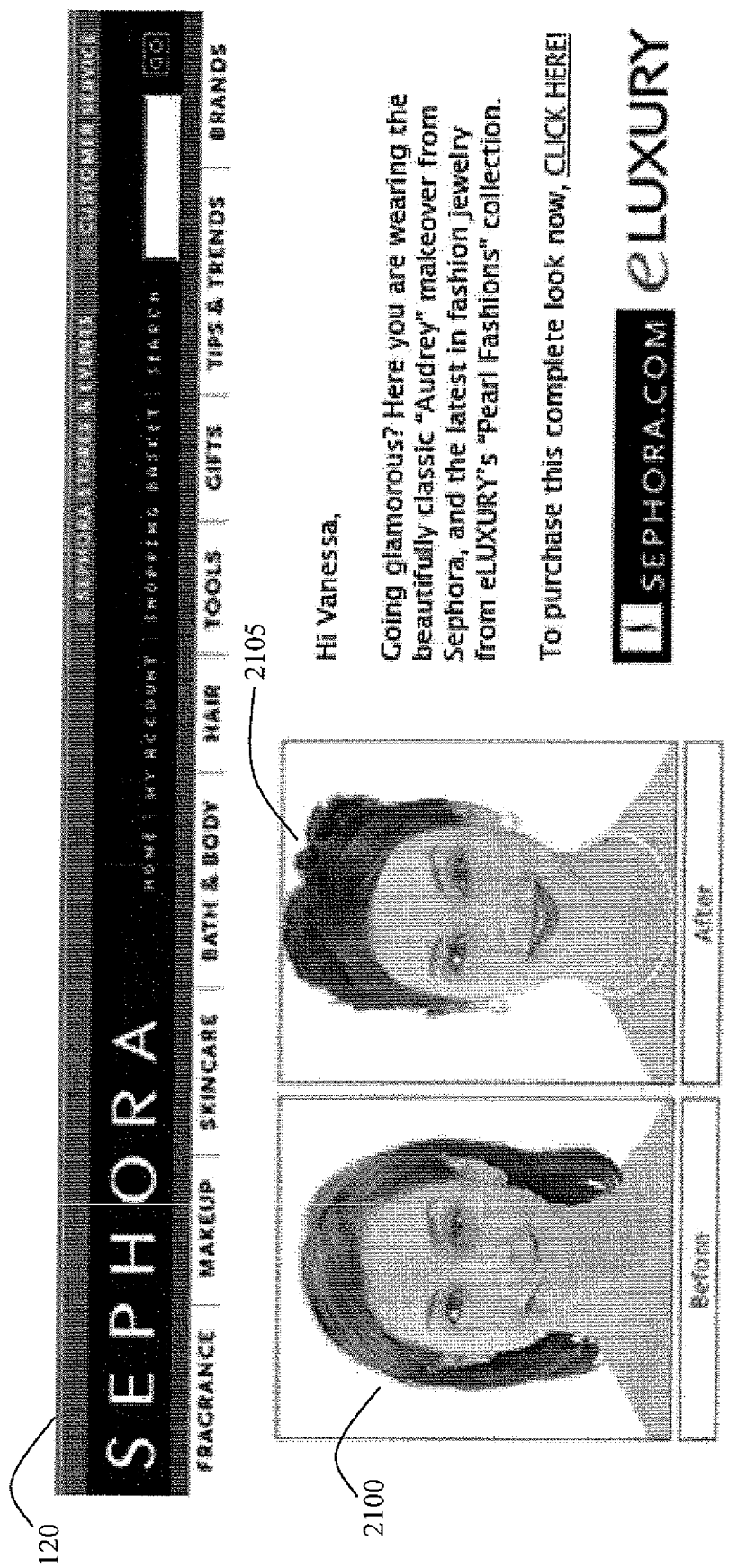
FIG. 21 illustrates an example of altering the photographic likeness of an ownership item of the user.

FIG. 21 illustrates yet another example of altering the photographic likeness of the user's ownership item. A Web page 120 includes a photographic likeness of the user 2100. The photographic likeness of the user 2100 is altered using the user's preferences stored in the user profile 50 to provide an altered photographic likeness of the user with a new makeover and jewelry 2105, which incorporates products from advertising clients that adhere to the user's preferences. The altered photographic likeness of the user 2105 allows the user to preview herself incorporating products of possible interest to the user and that adhere to the user's preferences. In the specific example shown in FIG. 21, the altered photographic likeness of the user 2105 incorporates a makeover by Sephora (the advertising client) and recommends purchasing jewelry accessories from eLUXURY (another advertising client). In addition, the user may be given the option of incorporating other products (e.g., earrings and other accessories) within the altered photographic likeness of the user 2105.

Figure 22:
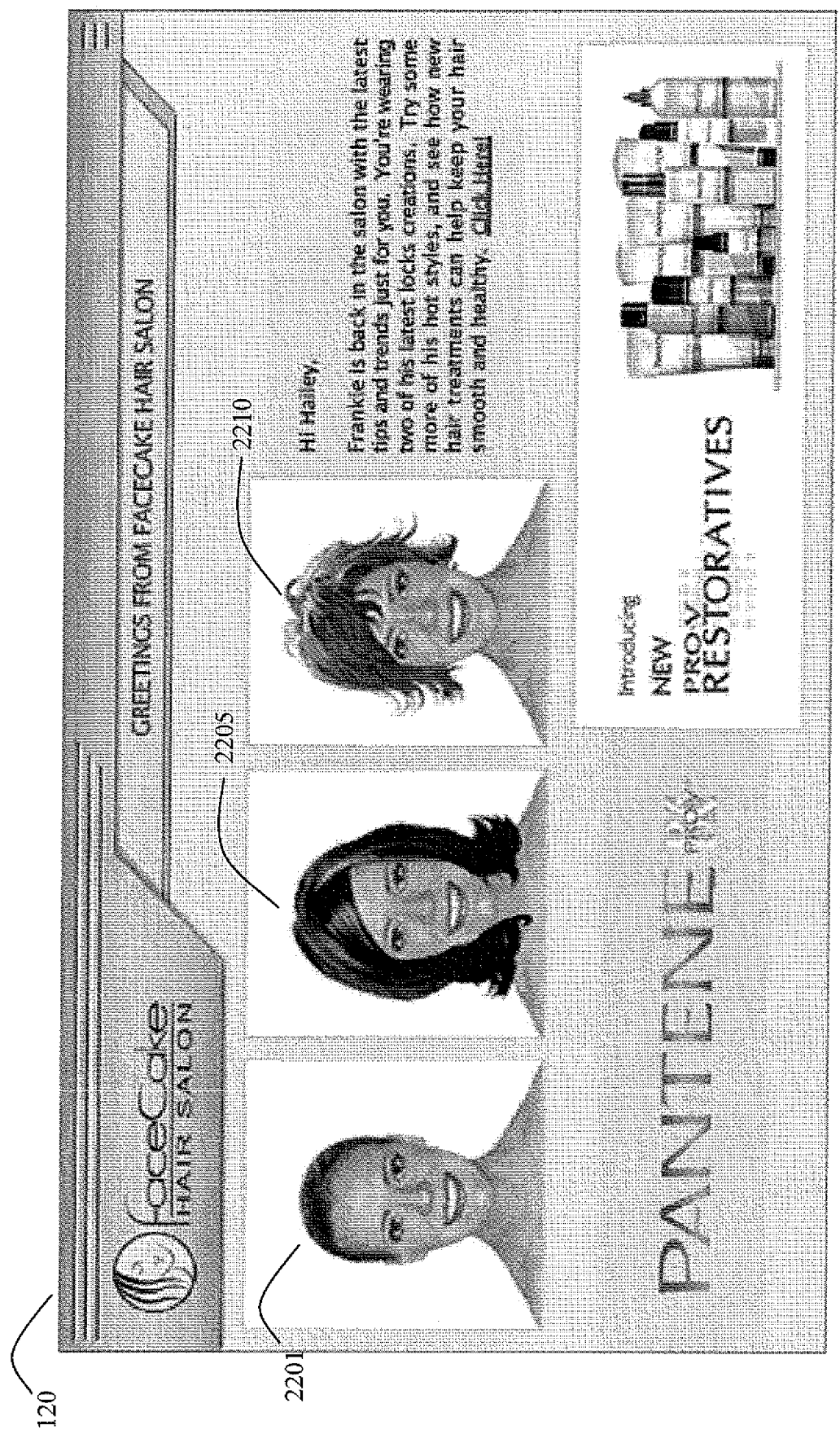
FIG. 22 illustrates an example of altering the photographic likeness of an ownership item of the user.

FIG. 22 illustrates yet another example of altering the photographic likeness of the user's ownership item. A Web page 120 includes a photographic likeness of the user 2201. The photographic likeness of the user 2201 is altered using the user's preferences stored in the user profile 50 to provide an altered photographic likeness of the user with different hairstyles 2205 and 2210, which incorporates products from advertising clients that adhere to the user's preferences. The altered photographic likenesses of the user 2205 and 2210 allow the user to preview herself incorporating products of possible interest to the user and that adhere to the user's preferences. In the specific example shown in FIG. 22, the altered photographic likenesses of the user 2205 and 2210 incorporate styles from Frankie's Salon (the advertising client) and recommends hair products from Pro-V Restoratives (another advertising client). In addition, the user may be given the option of incorporating other products within the altered photographic likenesses of the user 2205 and 2210.

FIG. 23 illustrates yet another example of altering the photographic likeness of the user's ownership item. A Web page 120 includes a photographic likeness of the user 2301. The photographic likeness of the user 2301 is altered using the user's preferences stored in the user profile 50 to provide an altered photographic likeness of the user with more fuller lips 2305, which incorporates products from advertising clients that adhere to the user's preferences. The altered photographic likeness of the user 2305 allows the user to preview herself incorporating products of possible interest to the user and that adhere to the user's preferences. In the specific example shown in FIG. 23, the altered photographic likeness of the user 2305 incorporates products from Restylane (the advertising client).

FIG. 24 illustrates yet another example of altering the photographic likeness of the user's ownership item. A Web page 120 includes a photographic likeness of the user 2401. The photographic likeness of the user 2401 is altered using the user's preferences stored in the user profile 50 to provide an altered photographic likeness of the user significantly thinner 2405, which incorporates products from advertising clients that adhere to the user's preferences. The altered photographic likeness of the user 2405 allows the user to preview himself) incorporating products of possible interest to the user and that adhere to the user's preferences. In the specific example shown in FIG. 24, the altered photographic likeness of the user 2405 illustrates the potential results after using products from NutriSystem (the advertising client).

Having described embodiments of the Targeted Online Marketing System and Method, it should be apparent to those skilled in the art that certain advantages have been achieved. It should also be appreciated that various modifications, adaptations, and alternative embodiments thereof may be made within the scope and spirit of the present invention. The scope of the present invention is defined by the following claims.

What is claimed is:

1. A computer-implemented method for targeting marketing content to a user, comprising:
    collecting data elements in a user profile, the data elements include a photographic likeness of the user's ownership item;
    processing the photographic likeness of the user's ownership item, the processing includes identifying characteristics of the user's ownership item, the processing performed by a processor on a computer executing one or more instructions;
    adding the identified characteristics to the user profile;
    comparing the user profile to a target profile associated with the marketing content, the comparing performed by the processor on a computer executing one or more instructions;
    selecting, based on the comparing, the marketing content that matches the user profile, the selecting performed by the processor on a computer executing one or more instructions;
    altering the photographic likeness of the user's ownership item to incorporate the selected marketing content; and
    presenting the user with the altered photographic likeness of the user's ownership item, wherein the user's ownership item comprises an automobile, a room, a home exterior, a home interior, a landscape, a pet, a family or family members.

2. The method of claim 1 wherein collecting data elements includes collecting initial survey responses, context-specific survey responses, or random survey responses.

3. The method of claim 1 wherein collecting data elements includes tracking the user's browsing habits or purchasing patterns.

4. The method of claim 1 wherein collecting data elements includes collecting product and service trial responses.

5. The method of claim 1 wherein collecting data elements includes collecting the user's interaction with the user's photographic likeness.

6. The method of claim 1 wherein the photographic likeness of the user's ownership item is a computer graphics file that is collected via email.

7. The method of claim 1 wherein the photographic likeness of the user's ownership item is a digital image of a photograph of the ownership item that is received by a Web site operator.

8. The method of claim 1 wherein the photographic likeness of the user's ownership item is built by a photographic-likeness-building software or built by another software using information collected from the user.

9. The method of claim 1 wherein the photographic likeness of the user's ownership item is generated by a mobile device.

10. The method of claim 1 wherein processing the photographic likeness of the user's ownership item includes converting the photographic likeness of the user's ownership item to a standard image.

11. The method of claim 1 further comprising:
assigning metrics to the data elements in the user profile; and
generating data indices by applying the assigned metrics to market segmentation variables, wherein the data indices identify the user's preferences or purchasing habits with respect to the market segmentation variables.

12. The method of claim 11 wherein the metrics represent either incremental or decremental changes in the market segmentation variables.

13. The method of claim 1 further comprising assigning confidence factors to the data elements, wherein the confidence factors decay over time.

14. The method of claim 1 further comprising:
identifying a deficient data element in the user profile;
identifying marketing content having an associated market segmentation variable that relates to the deficient data element; and
generating a context-sensitive question that relates to the marketing content, wherein an answer to the context-sensitive question supplies the deficient data element.

15. The method of claim 1 wherein the user's ownership item is a home interior.

16. A system for targeting marketing content to a user, comprising:
a user profile that includes a plurality of data elements, the data elements including a photographic likeness of the user's ownership item;
a likeness-processing component to process the photographic likeness of the user's ownership item including identifying characteristics of the user's ownership item;
a comparison component to compare the user profile to a target profile associated with the marketing content;
a metrics assigned to the data elements in the user profile; and
data indices generated by applying the assigned metrics to market segmentation variables, wherein the data indices identify the user's preferences or purchasing habits with respect to the market segmentation variables, wherein the metrics represent either incremental or decremental changes in the market segmentation variables.

17. The system of claim 16 wherein another one of the at least one data element is: initial survey responses, context-specific survey responses, random survey responses, browsing habits, or purchasing patterns.

18. The system of claim 16 wherein the photographic likeness of the user's ownership item is a computer graphics file.

19. The system of claim 16 wherein the photographic likeness of the user's ownership item is a digital image of a photograph of the ownership item received by a Web site operator.

20. The system of claim 16 wherein the photographic likeness of the user's ownership item is built by a photographic-likeness-building software or built by another software using information collected from the user.

21. The system of claim 16 wherein the photographic likeness of the user's ownership item is generated by a mobile device.

22. The system of claim 16 further comprising a profile processing component to convert the photographic likeness of the user's ownership item to a standard image.

23. The system of claim 22 further comprising
at least one metric, each of the at least one metric assigned to a corresponding one of the at least one data element; and
at least one data index, each of the at least one data index generated by applying the at least one metric to a corresponding at least one market segmentation variable, wherein the at least one data index identifies the user's preferences or purchasing habits with respect to the at least one market segmentation variable.

24. The system of claim 16 further comprising at least one confidence factor, each of the at least one confidence factor assigned to a corresponding one of the at least one data element, wherein the at least one confidence factor decays over time.

25. The system of claim 16 wherein the user's ownership item comprises an automobile, a room, a home exterior, a home interior, landscape, pets, a family or family members.

26. A computer-implemented method for targeting marketing content to a user, comprising:
collecting data elements in a user profile, the data elements include a photographic likeness of the user;
processing the photographic likeness of the user, the processing includes identifying features of the user found in the photographic likeness, the processing performed by a processor on a computer executing one or more instructions;
adding the identified features to the user profile;
comparing the user profile to a target profile associated with the marketing content, the comparing performed by the processor on a computer executing one or more instructions;
selecting, based on the comparing, the marketing content that matches the user profile, the selecting performed by the processor on a computer executing one or more instructions;
altering the photographic likeness of the user to simulate application of the selected marketing content to the photographic likeness of the user;

presenting the user with the altered photographic likeness of the user;

assigning metrics to the data elements in the user profile; and generating data indices by applying the assigned metrics to market segmentation variables, wherein the data indices identify the user's preferences or purchasing habits with respect to the market segmentation variables, wherein the metrics represent either incremental or decremental changes in the market segmentation variables.

27. The method of claim 26 wherein collecting data elements includes tracking the user's browsing habits, purchasing patterns, or marketing content selected for application to the photographic likeness of the user.

28. The method of claim 26 wherein the photographic likeness of the user is built by a photographic-likeness-building software or built by another software using information collected from the user.

29. The method of claim 26 wherein the photographic likeness of the user is generated by a mobile device.

30. The method of claim 26 wherein the photographic likeness of the user is altered to simulate the application of a cosmetic procedure.

31. The method of claim 30 wherein the cosmetic procedure comprises removal of age spots, facelift, injection of fillers, or teeth whitening.

32. The method of claim 26 wherein identifying features of the user include identifying the user's hairline, and wherein the photographic likeness of the user is altered to simulate hair growth resulting from application of a hair restoration product.

33. The method of claim 26 wherein the photographic likeness of the user is altered to simulate weight change resulting from use of a weight changing product.

34. The method of claim 26 wherein the photographic likeness of the user is altered to simulate a holographic image.

35. The method of claim 26 wherein the photographic likeness of the user is altered to simulate the user talking.

36. A non-transitory computer-readable storage medium having computer-executable instructions for performing a method for targeting marketing content to a user, comprising:

collecting data elements in a user profile, the data elements include a photographic likeness of a user's ownership item;

assigning confidence factors to the data elements, wherein the confidence factors decay over time;

processing the photographic likeness of the user's ownership item, the processing includes identifying characteristics of the user's ownership item;

adding the identified characteristics to the user profile;

comparing the user profile to a target profile associated with the marketing content;

selecting, based on the comparing, marketing content that matches the user profile;

altering the photographic likeness of the user's ownership item to incorporate the selected marketing content; and presenting the user with the altered photographic likeness of the user's ownership item.

37. A non-transitory computer-readable storage medium having computer-executable instructions for performing a method for targeting marketing content to a user, comprising:

collecting data elements in a user profile, the data elements include a photographic likeness of a user;

processing the photographic likeness of the user, the processing includes identifying features of the user found in the photographic likeness;

adding the identified features to the user profile;

identifying a deficient data element in the user profile;

identifying marketing content having an associated market segmentation variable that relates to the deficient data element generating a context-sensitive question that relates to the marketing content, wherein an answer to the context-sensitive question supplies the deficient data element;

comparing the user profile to a target profile associated with the marketing content;

selecting, based on the comparing, the marketing content that matches the user profile;

altering the photographic likeness of the user to simulate application of the selected marketing content to the photographic likeness of the user; and presenting the user with the altered photographic likeness of the user.

38. The method of claim 1 wherein the altered photographic likeness of the user's ownership item includes using background imagery to enhance marketing content.

39. The method of claim 1 wherein the altered photographic likeness of the user's ownership item includes application of makeup comprising eyebrow pencil, foundation, and concealers.

40. The method of claim 1 wherein the altered photographic likeness of the user's ownership item includes new hairstyles comprising different hair color, cut and style.

41. The method of claim 1 wherein the altered photographic likeness of the user's ownership item includes the effects of cosmetic applications comprising a cosmetic moisturizer, hair styling product, and a self tanner.

42. The system of claim 16 wherein the altered photographic likeness of the user's ownership item includes using background imagery to enhance marketing content.

43. The system of claim 16 wherein the altered photographic likeness of the user's ownership item includes application of makeup comprising eyebrow pencil, foundation, and concealers.

44. The system of claim 16 wherein the altered photographic likeness of the user's ownership item includes new hairstyles comprising different hair color, cut and style.

45. The system of claim 16 wherein the altered photographic likeness of the user's ownership item includes the effects of cosmetic applications comprising a cosmetic moisturizer, hair styling product, and a self tanner.

* * * * *